United States Patent
Karsi et al.

(10) Patent No.: US 9,137,688 B2
(45) Date of Patent: Sep. 15, 2015

(54) CROSS CORRELATION NULLING FOR INTERFERENCE RESOLUTION

(71) Applicant: CYGNUS BROADBAND, INC., San Diego, CA (US)

(72) Inventors: Murat Karsi, San Diego, CA (US); Kenneth L. Stanwood, Vista, CA (US); David Gell, San Diego, CA (US)

(73) Assignee: Wi-LAN Labs, Inc., San Diego, CA (US)

( * ) Notice: Subject to any disclaimer, the term of this patent is extended or adjusted under 35 U.S.C. 154(b) by 0 days.

(21) Appl. No.: 14/298,774

(22) Filed: Jun. 6, 2014

(65) Prior Publication Data

US 2014/0286270 A1    Sep. 25, 2014

Related U.S. Application Data

(63) Continuation-in-part of application No. 14/206,853, filed on Mar. 12, 2014.

(60) Provisional application No. 61/832,629, filed on Jun. 7, 2013, provisional application No. 61/835,431, filed on Jun. 14, 2013, provisional application No. 61/798,572, filed on Mar. 15, 2013.

(51) Int. Cl.
*H04B 1/00* (2006.01)
*H04W 24/02* (2009.01)
(Continued)

(52) U.S. Cl.
CPC ............ *H04W 24/02* (2013.01); *H04J 11/0056* (2013.01); *H04J 11/0059* (2013.01); *H04L 5/0058* (2013.01)

(58) Field of Classification Search
CPC ... H04L 5/0073; H04L 5/006; H04L 25/0242; H04L 25/085; H04L 5/0058; H04B 2201/70702; H04B 17/336; H04W 24/02; H04J 11/0059; H04J 11/0056
USPC .............................. 455/63.1, 114.2
See application file for complete search history.

(56) References Cited

U.S. PATENT DOCUMENTS 8,204,442 B2    6/2012    Sankar et al.
2010/0087221 A1    4/2010    Srinivasan et al.
(Continued)

FOREIGN PATENT DOCUMENTS

EP    2750475 A1    7/2014
WO    2011/088465 A1    7/2011
(Continued)

OTHER PUBLICATIONS

International Search Report and Written Opinion for PCT/US2014/041411, mailed on Sep. 23, 2014, in 10 pages.
(Continued)

*Primary Examiner* — Ronald Eisner
(74) *Attorney, Agent, or Firm* — Procopio, Cory, Hargreaves & Savitch, LLP

(57) ABSTRACT

Systems and methods generate corrected channel transfer functions by cross-correlation nulling. In an example system, a first receiver node (which may be a wireless base station) receives first expected reference signal information associated with an interfering transmitter node (which may be a wireless user equipment) and creates a correction matrix based on the first expected reference signal information associated with the interfering transmitter node and on second expected reference signal information associated with an intended transmitter node. The correction matrix can then be applied to an estimated channel transfer function associated with a received transmission from the intended transmitter node to generate a corrected channel transfer function associated with the received transmission from the intended transmitter node. The first receiver node can use the corrected channel transfer function in decoding received transmissions including, for example, use in performing interference resolution.

27 Claims, 16 Drawing Sheets

(51) Int. Cl.
H04L 5/00 (2006.01)
H04J 11/00 (2006.01)

(56) References Cited

U.S. PATENT DOCUMENTS

| | | | |
|---|---|---|---|
| 2011/0065447 A1 | 3/2011 | Hahm et al. | |
| 2011/0124289 A1* | 5/2011 | Balachandran et al. | 455/63.1 |
| 2011/0201341 A1* | 8/2011 | Choudhury et al. | 455/450 |

FOREIGN PATENT DOCUMENTS

| | | |
|---|---|---|
| WO | 2011/159042 A2 | 12/2011 |
| WO | 2012/139624 A1 | 10/2012 |
| WO | 2013/029413 A1 | 3/2013 |
| WO | 2013/069627 A1 | 5/2013 |

OTHER PUBLICATIONS

Brück. "3G/4G Mobile Communications Systems." Qualcomm Corporate R&D Center Germany. Mar. 5, 2012, 19 pages.
Pauli et al. "Heterogeneous LTE Networks and Inter-Cell Interference Coordination." Novel Mobile Radio Research. Dec. 2010, 9 pages.
Pauli et al. "Inter-Cell Interference Coordination for LTE-A." Novel Mobile Radio Research. Sep. 2011, 7 pages.
Jia-Ming et al. "A New Channel Estimation Model in OFDM System Based on Improved Pilot Training Sequence." 2004 4th International Conference on Microwave and Millimeter Wave Technology Proceedings. pp. 846-849.
"Exploring the World of Wireless LTE-Advanced and Coordinated Multi-Point (COMP): What Goes Around, Comes Around. Special Preview Edition." Signals Ahead. 8(5):Apr. 16, 2012.
Rayal. "An overview of the LTE physical layer." EE Times. May 24, 2010. Downloaded from the following sites on Jul. 29, 2014: http://www.eetimes.com/document.asp?doc_id=1278096; http://www.eetimes.com/document.asp?doc_id=1278137; htlp://www.eetimes.com/document.asp?doc_id=1278199.
Du et al. "Channel Estimation for D-BLAST OFDM Systems." School of Electrical and Computer Engineering, Georgia Institute of Technology, Atlanta, GA. Nov. 2002, 5 pages.
Ozdemir et al. "Channel Estimation for Wireless OFDM Systems." IEEE Communications Surveys & Tutorials. 9(2):18-48 (2nd Quarter 2007).
Li et al. "Channel Estimation for OFDM Systems with Transmitter Diversity in Mobile Wireless Channels." IEEE Journal on Selected Areas in Communications. 17(3):461-471 (Mar. 1999).

Sawahashi et al. "Coordinated Multipoint Transmission/Reception Techniques for LTE-Advanced." IEEE Wireless Communications, Jun. 2010 (pp. 26-34).
Lee et al. "Coordinated Multipoint Transmission and Reception in LTE-Advanced: Deployment Scenarios and Operational Challenges." IEEE Communications Magazine, Feb. 2012 (pp. 148-155).
Lee et al. "Coordinated Multipoint Transmission and Reception in LTE-Advanced Systems." IEEE Communications Magazine, Nov. 2012 (pp. 44-50).
Boudreau et al. "Interference Coordination and Cancellation for 4G Networks." LTE Part II: 3GPP Release 8. IEEE Communications Magazine, Apr. 2009 (pp. 74-81).
Léost et al. "Interference Rejection Combining in LTE Networks." Bell Labs Technical Journal. 17(1):25-50 (2012).
Wild et al. "Joint Channel Estimation across Multiple Cells in Coordinated Multi-Point." IEEE 2012, pp. 845-849.
Kottkamp et al. "LTE-Advanced Technology Introduction White Paper." Rohde & Schwarz. Aug. 2012, 41 pages.
Roessler et al. "LTE- Advanced (3GPP Rel.11) Technology Introduction White Paper." Rohde & Schwarz. Jul. 2013, 39 pages.
Taoka et al. "MIMO and CoMP in LTE-Advanced." NTT DOCOMO Technical Journal. 12(2):20-28, Sep. 2010.
Panasonic. "Uplink enhancement for Rel.11." 3GPP TSG-RAN WG1 Meeting #66, R1-112367. Athens, Greece, Aug. 22-26, 2011. 4 pages.
Nokia. "DL CoMP phase2 simulation results." 3GPP TSG-RAN WG1 Meeting #66, R1-112384. Athens, Greece, Aug. 22-26, 2011. 5 pages.
Nokia. "On cell-edge enhancements via inter-cell orthogonal DM RS." 3GPP TSG-RAN WG1 Meeting #66, R1-112394, Athens, Greece, Aug. 22-26, 2011. 3 pages.
Samsung. "UL DMRS Enhancements in Rel.11." 3GPP TSG RAN WG1 #66, R1-112520, Athens, Greece, Aug. 22-26, 2011. 3 pages.
Li et al. "Simplified Channel Estimation for OFDM Systems With Multiple Transmit Antennas." IEEE Transactions on Wireless Communications. 1(1):67-75 (Jan. 2002).
Baker. "From Macro to Small Cells: Enhancements for Small Cells in 3GPP." Alcatel-Lucent. Small Cells Summit 2013, London, UK, 12 pages.
Määttänen et al. "System-level performance of LTE-Advanced with joint transmission and dynamic point selection schemes." EURASIP Journal on Advances in Signal Processing 2012, 2012:247 (37 pages).
Hou et al. "Unified View of Channel Estimation in MIMO-OFDM Systems." IEEE 2005, pp. 34-38.
International Search Report and Written opinion for related PCT/US2014/024150, mailed Jun. 12, 2014, in 17 pages.

* cited by examiner

CROSS CORRELATION NULLING FOR INTERFERENCE RESOLUTION

CROSS-REFERENCE TO RELATED APPLICATIONS

The application claims the benefit of U.S. provisional patent application Ser. No. 61/832,629, entitled "Uplink Interference Resolution," filed Jun. 7, 2013 and U.S. provisional patent application Ser. No. 61/835,431, entitled "Uplink Interference Resolution," filed Jun. 14, 2013, which are hereby incorporated by reference. This application is also a continuation-in-part of U.S. patent application Ser. No. 14/206,853, entitled "Uplink Interference Resolution in a Wireless Communication System," filed Mar. 12, 2014, which claims the benefit of U.S. provisional patent application Ser. No. 61/798,572, entitled "Uplink Interference Resolution," filed Mar. 15, 2013, which are hereby incorporated by reference.

FIELD OF THE INVENTION

The field of the invention is resolution of uplink (UL) interference in wireless communication systems.

BACKGROUND

Throughout this document the term station, such as used in base station, macro station, macro base station, femto base station, and femto station, is intended to denote the communications equipment. The term cell, such as used in femtocell or macrocell, is intended to denote the coverage footprint of a corresponding station or the coverage footprint of a sector of a multi-sector base station.

Broadband wireless cells tend to be UL interference limited. There are many scenarios that can cause UL interference. The most common has historically been cell edge interference in a frequency reuse 1 network (where the same frequencies are used throughout a geographic area) or when neighboring cells share a frequency channel causing co-channel interference.

However, the Long Term Evolution (LTE) wireless standard adds an additional scenario. When a femto base station is present in the macrocell coverage footprint of a macro base station in a frequency reuse 1 network, this can create what is termed in LTE as the near-far problem. If a user equipment (UE) is in the femtocell coverage area of the femto base station, but is in communication with the more distant macro base station it may be transmitting using a very high power, causing excessive uplink interference at the femto base station. Many other uplink interference scenarios exist.

Aside from brute force methods such as using very robust and inefficient modulation and coding schemes, current methods to combat this include coordinated multipoint (CoMP) which contains multiple methods. First, fractional frequency reuse may be used, coordinating the UL resources so that a UE communication with a macrocell and a UE communication with a femto base station that has an overlapping coverage footprint do not transmit on the same subcarriers simultaneously. This technique has been previously used in WiMAX. Second, the two base stations may use beamforming to coordinate the UL resources spatially. Both of these methods require coordinated scheduling. Additionally, using joint reception, both base stations receive the same data from an individual UE using the same subcarriers at the same time. This may additionally be beamformed. The joint reception, of course, uses double the resources since the resources of both base stations are tied up with the same reception.

Fractional frequency reuse is inefficient due to the need for one base station to not schedule UL resources while the other is using them. Beamforming requires significant antenna resources which may not be available on a femto base station. Additionally, there may be times when coordinated scheduling of beamforming cannot be achieved due to the bandwidth and quality of service (QoS)/quality of experience (QoE) needs of interfering UEs, requiring a fallback to fractional frequency reuse.

Other attempts to combat uplink interference include use of Inter-Cell Interference Cancellation (ICIC) techniques. Such ICIC techniques include signaling between base stations to inform other stations about future planned transmissions of a base station, and reporting the interference levels experienced by a base station. These techniques use High Interference Indicator (HII) and an Overload Indicator (OI) respectively. HII technique is not spectrally efficient since it may result in base stations avoiding use of bandwidth resources if they heed the planned transmission information provided by the base station providing the HII. OI technique has the additional drawback that it only reports the exposure to interference level after the exposure has occurred.

There exists a need for a spectrally efficient (e.g., efficient modulation and coding, transmitting using substantially more available time and frequency resources) method to resolve UL interference as an alternative to existing spectrally inefficient solutions which merely mitigate UL interference.

SUMMARY

In one aspect, a method is provided for generating a corrected channel transfer function in a first receiver node. The method includes: receiving, at the first receiver node, first expected reference signal information associated with an interfering transmitter node; creating a correction matrix based at least in part on the first expected reference signal information associated with the interfering transmitter node and on second expected reference signal information associated with an intended transmitter node; and applying the correction matrix to an estimated channel transfer function associated with a received transmission from the intended transmitter node to generate a corrected channel transfer function associated with the received transmission from the intended transmitter node.

In one aspect, an access node is provided that includes: a transceiver module configured to receive and send data via a wireless communication network; a backhaul interface module configured to receive and send data via a backhaul communication link, the received data including first expected reference signal information associated with an interfering user equipment; a memory module; and a processor module coupled to the backhaul interface module and the memory module and configured to: create a correction matrix based at least in part on the first expected reference signal information associated with the interfering user equipment and on second expected reference signal information associated with an intended user equipment and apply the correction matrix to an estimated channel transfer function associated with a received transmission from the intended user equipment to generate a corrected channel transfer function associated with the received transmission from the intended user equipment.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Systems and methods for resolving uplink interference in a communication network are provided that may allow more efficient modulation and coding and more efficient allocation of uplink resources.

Figure 1:
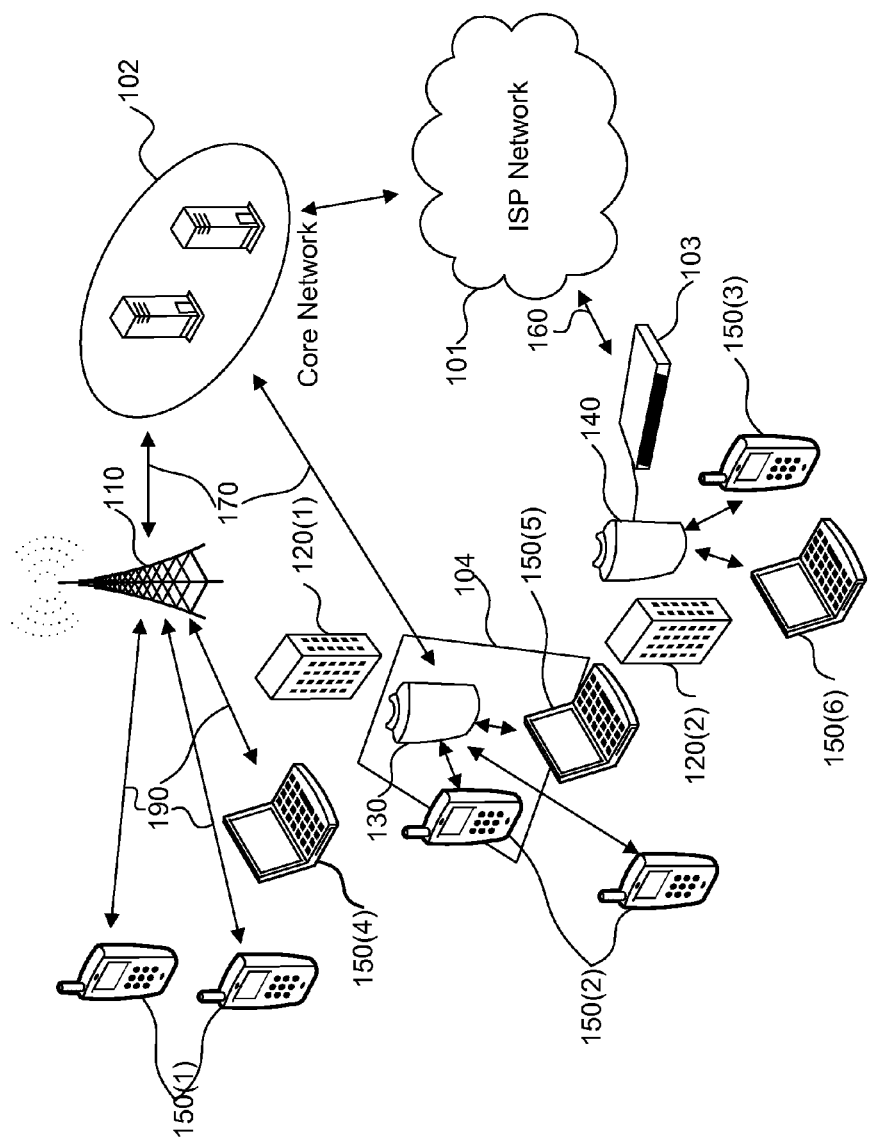
FIG. 1 is a block diagram of a communication network in which systems and methods disclosed herein can be implemented in accordance with aspects of the invention.

FIG. 1 is a block diagram of a communication network in which systems and methods disclosed herein can be implemented in accordance with aspects of the invention. A macro base station 110 is connected to a core network 102 through a backhaul connection 170. In an embodiment, the backhaul connection 170 is a bidirectional link or two unidirectional links. The direction from the core network 102 to the macro base station 110 is referred to as the downstream or downlink (DL) direction. The direction from the macro base station 110 to the core network 102 is referred to as the upstream or uplink (UL) direction. Subscriber stations 150(1) and 150(4) can connect to the core network 102 through the macro base station 110. Wireless links 190 between subscriber stations 150 and the macro base station 110 are bidirectional point-to-multipoint links, in an embodiment. The direction of the wireless links 190 from the macro base station 110 to the subscriber stations 150 is referred to as the downlink or downstream direction. The direction of the wireless links 190 from the subscriber stations 150 to the macro base station 110 is referred to as the uplink or upstream direction. Subscriber stations are sometimes referred to as user equipment (UE), users, user devices, handsets, terminal nodes, or user terminals and are often mobile devices such as smart phones or tablets. The subscriber stations 150 access content over the wireless links 190 using base stations, such as the macro base station 110, as a bridge.

In the network configuration illustrated in FIG. 1, an office building 120(1) causes a coverage shadow 104. A pico station 130 can provide coverage to subscriber stations 150(2) and 150(5) in the coverage shadow 104. The pico station 130 is connected to the core network 102 via a backhaul connection 170. The subscriber stations 150(2) and 150(5) may be connected to the pico station 130 via links that are similar to or the same as the wireless links 190 between subscriber stations 150(1) and 150(4) and the macro base station 110.

In office building 120(2), an enterprise femto base station 140 provides in-building coverage to subscriber stations 150(3) and 150(6). The enterprise femto base station 140 can connect to the core network 102 via an internet service provider network 101 by utilizing a broadband connection 160 provided by an enterprise gateway 103.

The wireless communication system described with respect to FIG. 1 can experience many UL interference scenarios.

Figure 2:
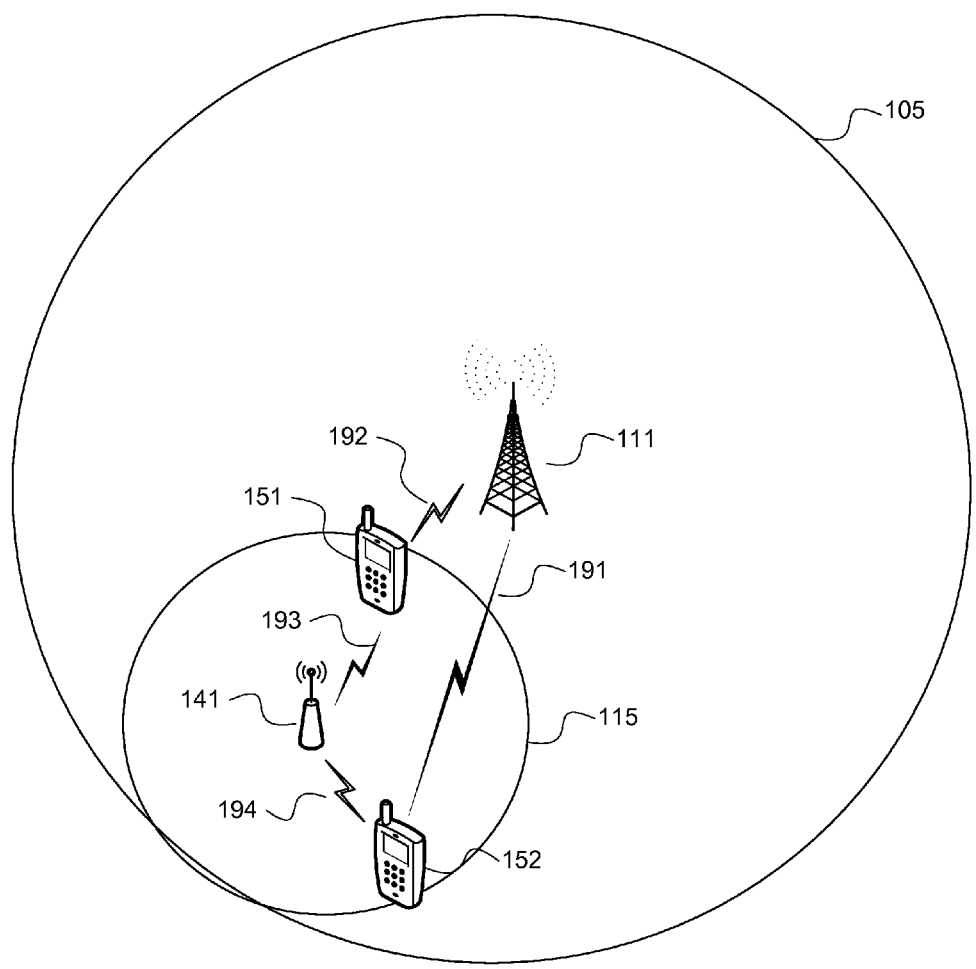
FIG. 2 is a block diagram showing uplink interference scenarios in a communication network in which systems and methods disclosed herein can be implemented in accordance with aspects of the invention.

FIG. 2 is a block diagram showing uplink interference scenarios in a communication network in which systems and methods disclosed herein can be implemented in accordance with aspects of the invention. FIG. 2 shows an LTE frequency reuse 1 scenario. A macrocell 105 representing the coverage area of macro station 111, which may be an instance of macro base station 110 of FIG. 1, and a femtocell 115 representing the coverage area of femto station 141, which may be an instance of enterprise femto base station 140 of FIG. 1, pico station 130 of FIG. 1, or another type of base station such as a residential femto base station. UE 151, which may be an instance of subscriber station 150 of FIG. 1, is part of a closed subscriber group (CSG) defined by access privilege to femto station 141. UE 152, which may be another instance of subscriber station 150 of FIG. 1, is not part of the CSG of femto station 141 even though it is geographically within the footprint of femtocell 115. This creates what is termed in LTE as the near-far problem. Macro station 111 may receive wanted signal 191 from UE 152 with weaker signal strength than it receives unwanted signal 192 from UE 151. Similarly, femto station 141 receives both the wanted signal 193 from UE 151 and an unwanted signal 194 from UE 152. Because UE 152 is attempting to communicate with the more distant macro station 111, unwanted signal 194 may be stronger than wanted signal 193.

The scenarios illustrated in FIG. 2 can be further complicated when there is, for example, another femto station within the footprint of macrocell 105 sharing a cell edge with femtocell 115 allowing an additional interfering source.

Figure 3:
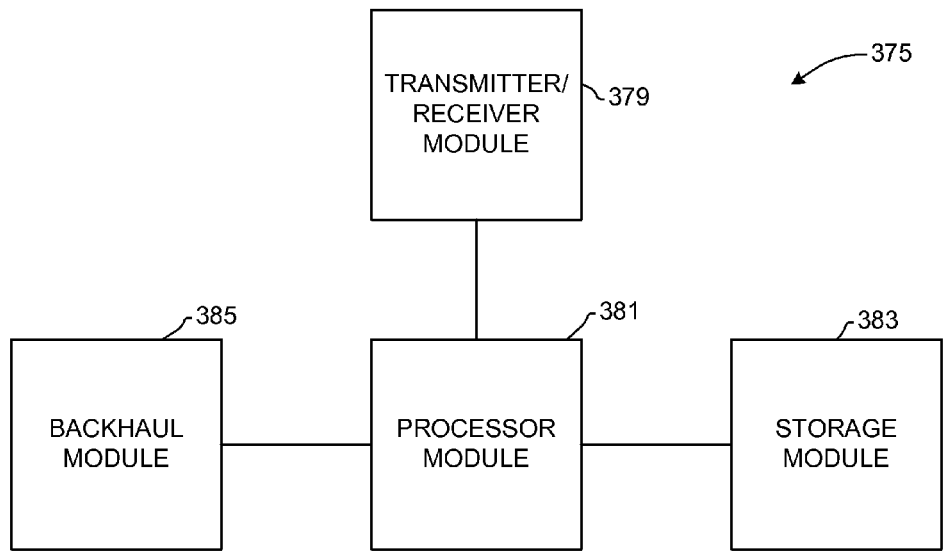
FIG. 3 is a block diagram of a base station in accordance with aspects of the invention.

FIG. 3 is a functional block diagram of a base station 375 in accordance with aspects of the invention. In various embodiments, the base station 375 may be a mobile WiMAX base station, a Universal Mobile Telecommunications System (UMTS) NodeB, an LTE evolved Node B (eNB or eNodeB), or other wireless base station or access point of various form factors. For example, the macro base station 110, the pico station 130, or the enterprise femto base station 140 of FIG. 1 or the macro station 111 or femto station 141 of FIG. 2 may be provided, for example, by the base station 375 of FIG. 3. The base station 375 includes a processor module 381. The processor module 381 is coupled to a transmitter-receiver (transceiver) module 379, a backhaul interface module 385, and a storage module 383.

The transmitter-receiver module 379 is configured to transmit and receive communications wirelessly with other devices. The base station 375 generally includes one or more antennae for transmission and reception of radio signals. The communications of the transmitter-receiver module 379 may be with terminal nodes.

The backhaul interface module 385 provides communication between the base station 375 and a core network. This may include communications directly or indirectly (through intermediate devices) with other base stations, for example to implement the LTE X2 interface. The communication may be over a backhaul connection, for example, the backhaul connection 170 of FIG. 1. Communications received via the transmitter-receiver module 379 may be transmitted, after processing, on the backhaul connection. Similarly, communication received from the backhaul connection may be transmitted by the transmitter-receiver module 379. Although the base station 375 of FIG. 2 is shown with a single backhaul interface module 385, other embodiments of the base station 375 may include multiple backhaul interface modules. Similarly, the base station 375 may include multiple transmitter-receiver modules. The multiple backhaul interface modules and transmitter-receiver modules may operate according to different protocols. Communications originating within the base station 375, such as communications with other base stations, may be transmitted on one or more backhaul connections by backhaul interface module 385. Similarly, communications destined for base station 375 may be received from one or more backhaul connections via backhaul interface module 385.

The processor module 381 can process communications being received and transmitted by the base station 375. The storage module 383 stores data for use by the processor module 381. The storage module 383 (which may also be referred to as memory, memory device, memory module, or similar terms) may also be used to store computer readable instructions for execution by the processor module 381. The computer readable instructions can be used by the base station 375 for accomplishing the various functions of the base station 375. In an embodiment, the storage module 383 or parts of the storage module 383 may be considered a non-transitory machine readable medium. For concise explanation, the base station 375 or embodiments of it are described as having certain functionality. It will be appreciated that in some embodiments, this functionality is accomplished by the processor module 381 in conjunction with the storage module 383, transmitter-receiver module 379, and backhaul interface module 385. Furthermore, in addition to executing instructions, the processor module 381 may include specific purpose hardware to accomplish some functions.

Figure 4:
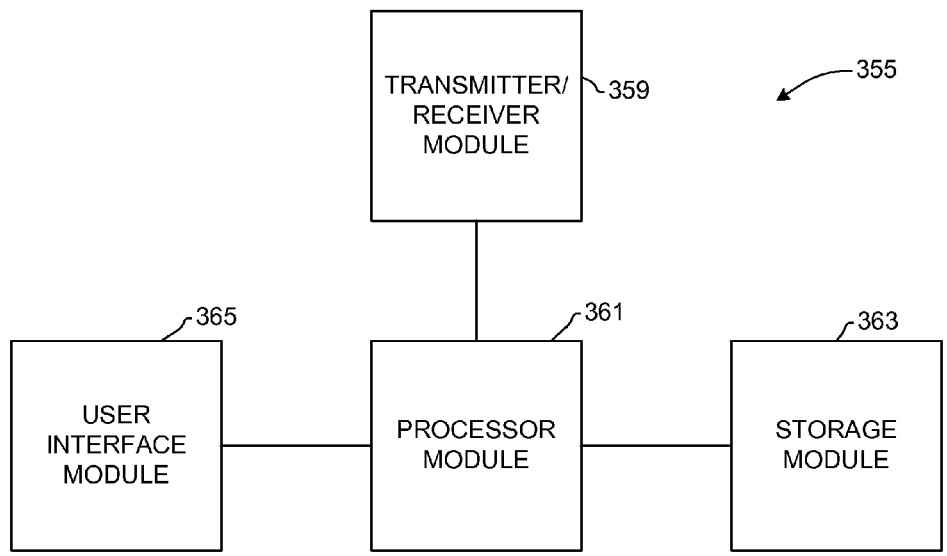
FIG. 4 is a block diagram of a terminal node in accordance with aspects of the invention.

FIG. 4 is a functional block diagram of a terminal node 355 in accordance with aspects of the invention. In various embodiments, the terminal node 355 may be a mobile WiMAX subscriber station, a UMTS cellular phone, an LTE user equipment, or other wireless terminal node of various form factors. The subscriber stations 150 of FIG. 1 or the UEs 151 and 152 of FIG. 2 may be provided, for example, by the terminal node 355 of FIG. 4. The terminal node 355 includes a processor module 361. The processor module 361 is coupled to a transmitter-receiver module (transceiver) 359, a user interface module 365, and a storage module 363.

The transmitter-receiver module 359 is configured to transmit and receive communications with other devices. For example, the transmitter-receiver module 359 may communicate with the base station 375 of FIG. 3 via its transmitter-receiver module 379. The terminal node 355 generally includes one or more antennae for transmission and reception of radio signals. Although the terminal node 355 of FIG. 4 is shown with a single transmitter-receiver module 359, other embodiments of the terminal node 355 may include multiple transmitter-receiver modules. The multiple transmitter-receiver modules may operate according to different protocols.

The terminal node 355, in many embodiments, provides data to and receives data from a person (user). Accordingly, the terminal node 355 includes the user interface module 365. The user interface module 365 includes modules for communicating with a person. The user interface module 365, in an embodiment, includes a speaker and a microphone for voice communications with the user, a screen for providing visual information to the user, and a keypad for accepting alphanumeric commands and data from the user. In some embodiments, a touch screen may be used in place of or in combination with the keypad to allow graphical inputs in addition to alphanumeric inputs. In an alternative embodiment, the user interface module 365 includes a computer interface, for example, a universal serial bus (USB) interface, to interface the terminal node 355 to a computer. For example, the terminal node 355 may be in the form of a dongle that can be connected to a notebook computer via the user interface module 365. The combination of computer and dongle may also be considered a terminal node. The user interface module 365 may have other configurations and include functions such as vibrators, cameras, and lights.

The processor module 361 can process communications being received and transmitted by the terminal node 355. The processor module 361 can also process inputs from and outputs to the user interface module 365. The storage module 363 stores data for use by the processor module 361. The storage module 363 may also be used to store computer readable instructions for execution by the processor module 361. The computer readable instructions can be used by the terminal node 355 for accomplishing the various functions of the terminal node 355. In an embodiment, the storage module 363 or parts of the storage module 363 may be considered a non-transitory machine readable medium. For concise explanation, the terminal node 355 or embodiments of it are described as having certain functionality. It will be appreciated that in some embodiments, this functionality is accomplished by the processor module 361 in conjunction with the storage module 363, the transmitter-receiver module 359, and the user interface module 365. Furthermore, in addition to executing instructions, the processor module 361 may include specific purpose hardware to accomplish some functions.

On-Demand Uncoordinated UL Multipoint Interference Resolution

On-demand uncoordinated UL multipoint interference resolution includes passing information from an assisting base station to a base station requesting additional help in resolving UL interference and decoding a received signal. This turns the UL signal resolution problem into an n source, n sensor problem (or n equations and n unknowns) allowing use of techniques such as joint decoding. Joint decoding is also used in uplink multiple-input multiple-output (UL MIMO) to separate out the UL signals and allow decoding of the data. Unlike UL MIMO, however, the UL transmissions are not coordinated other than the base stations benefit from being time synchronized to the level of tolerance of the orthogonal frequency division multiplexing (OFDM) symbol preamble, which is already necessary for evolved multimedia broadcast multicast services (eMBMS) and coordinated multipoint (CoMP), in LTE systems and is beneficial for handover in most wireless systems. Additionally, the multiple UL signals are received by different base stations rather than by different antenna on a single base station. As such, UL transmit power, modulation, and coding are not coordinated and neither is the choice of interfering UE.

Figure 5:
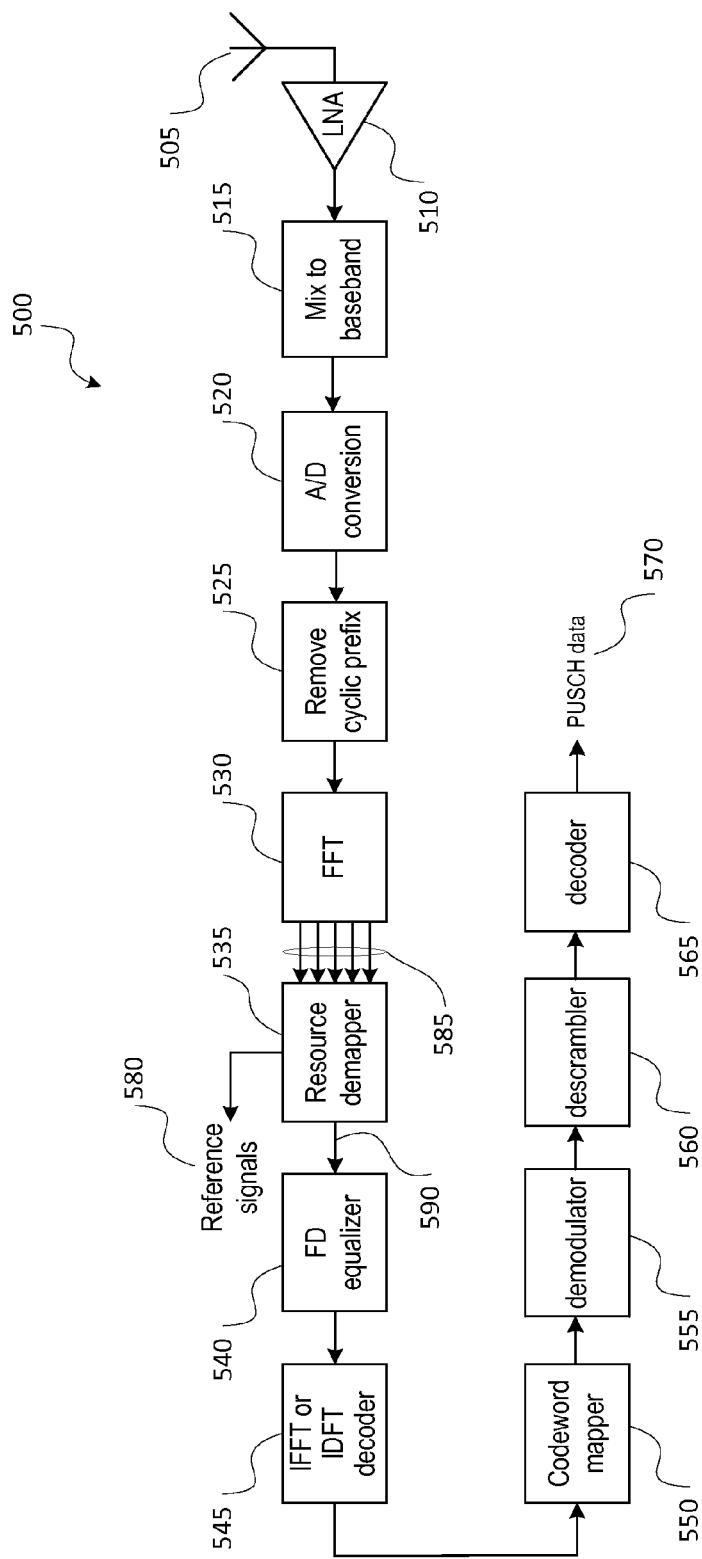
FIG. 5 is a block diagram of a single-carrier frequency division multiple access (SC-FDMA) receiver according to an example embodiment of the present invention.

FIG. 5 shows block diagram of an SC-FDMA receiver 500 according to an embodiment. The SC-FDMA receiver 500 may be used, for example, in the macro base station 110, the pico station 130, the enterprise femto base station 140 of FIG. 1, the macro station 111 or femto station 141 of FIG. 2. All or part of the SC-FDMA receiver 500 may be implemented by a receiver portion of the transceiver module 379 of the base station 375 of FIG. 3. Additionally, parts of the SC-FDMA receiver 500 may be implemented by the processor module 381 of the base station 375 of FIG. 3.

The SC-FDMA receiver 500 produces PUSCH data 570 from a signal received by an antenna 505. The antenna 505 is coupled to a low-noise amplifier 510. The output of the low-noise amplifier 510 is down converted to a baseband signal in a down-converter module 515. The baseband signal is digitized in an analog-to-digital converter module 520. A cyclic prefix module 525 removes cyclic prefixes from the digitized baseband signal.

The signal is then converted to the frequency domain by FFT module 530 to produce FFT outputs 585. The FFT outputs 585 may also be referred to as received frequency-domain resource element values. From the FFT outputs 585, the resource demapper 535 produces resource demapper output data including reference signal values 580 (e.g., reference signal 1030 for the PUSCH transmission 1010 of FIG. 10) and data elements values 590 (e.g., data element 1020 for the PUSCH transmission 1010 of FIG. 10), from each user equipment's uplink transmission. To aid in the extraction, the information in the subcarriers corresponding to an individual UL transmission's reference signal OFDM symbol is correlated with the expected reference signal to acquire the channel transfer function for the UL transmission.

The data elements 590 are equalized in the frequency-domain equalizer module 540 and then converted to the time domain in IFFT module 545. The time-domain signals are then processed in essentially the inverse of the processing performed by the transmitter by a code word mapper module 550, a demodulator module 555, a descrambler module 560, and a decoder module 565 to produce the received PUSCH data 570.

Figure 6:
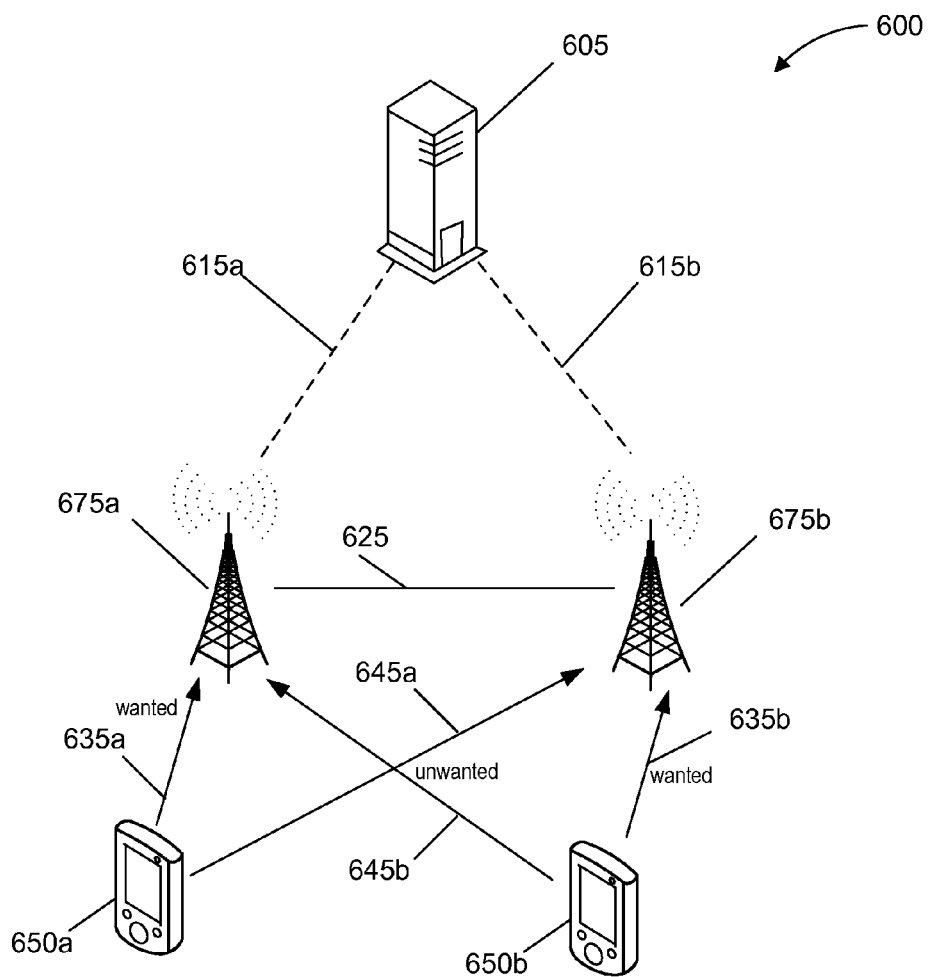
FIG. 6 is a block diagram of a communication system depicting neighboring base stations that communicate with each other to exchange information in accordance with aspects of the invention.

FIG. 6 is a block diagram of a communication system 600 depicting neighboring base stations that communicate with each other to exchange information in accordance with aspects of the invention. The communications between neighboring base stations can be on an on-demand basis and the information can be used to aid in the resolution of interference and the decoding of received signals. This may allow more efficient operational parameters to be used.

The communication system 600 includes a first base station 675a and a neighboring second base station 675b. The first base station 675a and the neighboring second base station 675b may be, for example, the macro base station 110, the pico station 130, or the enterprise femto base station 140 of FIG. 1 or the macro station 111 or femto station 141 of FIG. 2 and may be implemented, for example, using the base station 375 of FIG. 3. The base stations may also be referred to as access nodes and in the context of uplink communications may be referred to as receiver nodes.

The communication system 600 includes a first UE 650a and a second UE 650b. The first UE 650a and the second UE 650b may be, for example, the subscriber stations 150 of FIG. 1 or the UEs 151, 152 of FIG. 2 and may be implemented, for example, using the terminal node 355 of FIG. 4. The UEs may also be referred to as terminal nodes and in the context of uplink communications may be referred to as transmitter nodes.

In a given timeslot/subcarrier allocation, such as a physical resource block (PRB) in LTE or a tile in WiMAX, the first UE 650a may transmit to the first base station 675a while the second UE 650b transmits to the neighboring second base station 675b. Thus, the first base station 675a may receive a combination of wanted signal 635a from the first UE 650a and unwanted signal 645b from the second UE 650b. Since the first UE 650a transmits wanted signal 635a to the first base station 675a, the first base station 675a may view the first UE 650a as, for example, a desired UE or intended transmitter node. Similarly, the first base station 675a may view the second UE 650b as, for example, an interfering UE or interfering transmitter node.

The neighboring second base station 675b may receive a combination of wanted signal 635b from the second UE 650b and unwanted signal 645a from the first UE 650a. This may cause the first base station 675a, the neighboring second base station 675b, or both base stations to not be able to decode their respective wanted signal. This may be referred to as decoding ambiguity as each base station may not be able to correctly receive its respective wanted signal. The unwanted signals originate from the UEs as the same signals as the wanted signals but arrive at the respective base stations via different paths.

Unlike UL MIMO, neither base station has both received versions of the signals, that is to say neither base station has received both the signal representing the combination of wanted signal 635a and unwanted signal 645b and the signal representing the combination of wanted signal 635b and unwanted signal 645a. However, if a base station, for example, the first base station 675a, fails to correctly decode the wanted signal 635a in a particular PRB or tile, there may be enough information in the overall communication system 600 to correct the decoding. The first base station 675a and its neighbors, for example, the neighboring second base station 675*b*, both have a received signal, even if they are not able to decode that signal.

Both base stations may know information about the PRB in question for their wanted signal, for example in an OFDM or SC-FDMA system, the output of the FFT, the output of the resource demapper, a channel estimate, expected reference signals or preambles, etc.

A base station may or may not know its neighbors, where a neighbor can be any other base station with sufficient cell coverage overlap to have the potential to cause the base station to fail to decode its UL received signal. When the first base station 675*a* incorrectly decodes a PRB or tile, if it has sufficient processing resources and knows and is in communication with its neighbors, the first base station 675*a* may ask its neighbors for the baseband signals (or information associated with the signals) they received for the same PRB or tile. The request may be over a communication path 625 established for base station to base station communication, for example the X2 interface in an LTE system. The first base station 675*a* may also ask the neighbor for additional communication operating parameters of the neighbor's wanted signal, such as modulation, coding, and reference signal (RS) parameters. The first base station 675*a* may then use one of the techniques described below to improve the decoding of its own wanted signal.

First base station 675*a* may request a central entity 605, such as a network management system (NMS) or gateway in core network 102 of FIG. 1, to request the necessary data and even to perform the requisite processing. The first base station 675*a* may request assistance from the central entity 605, for example, when the first base station 675*a* does not know its neighbors, cannot communicate directly with its neighbors, or lacks sufficient processing capability. The central entity 605 communicates with the first base station 675*a* over communication path 615*a*, for example a backhaul link such as backhaul connection 170 of FIG. 1, and with the neighboring second base station 675*b* over communication path 615*b*, for example a second backhaul link. The communication between a base station and a central entity 605 may take many forms.

Whether the central entity 605 assists or not, the additional signal information may be only made available on an as requested basis when initial decoding attempts fail. This on-demand aspect may cause occasional processing delay but can reduce the need to use spectrally inefficient methods to mitigate UL interference.

Methods of Operating a Base Station

Figure 7:
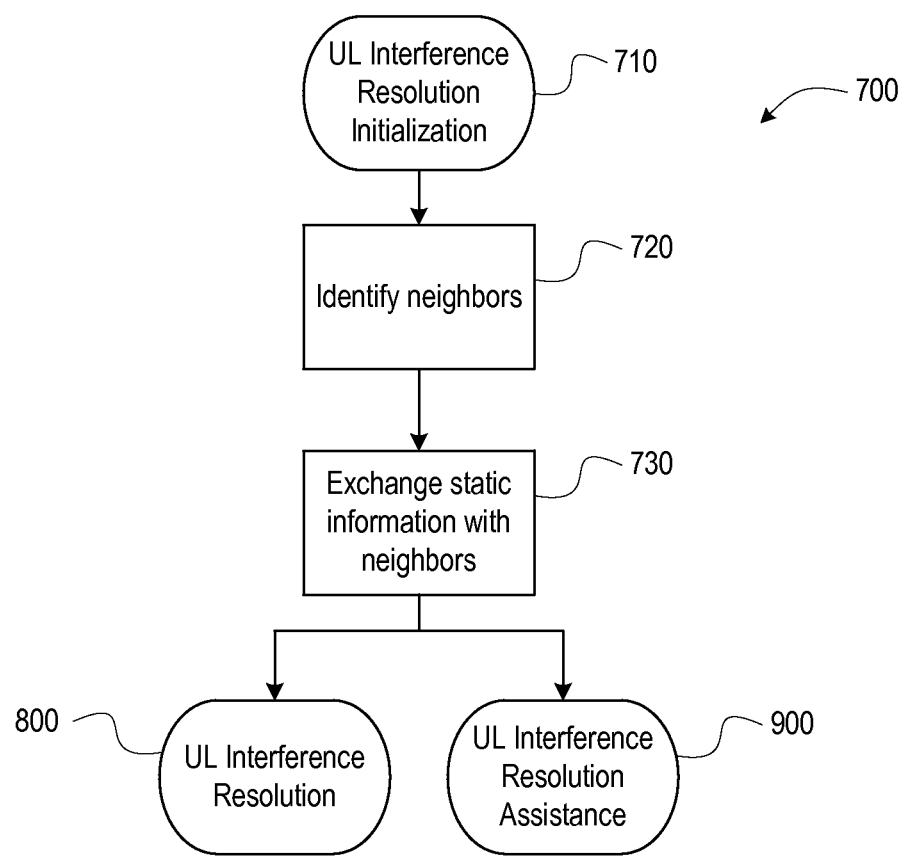
FIG. 7 is a flowchart of a method for initialization of a base station in preparation for performing on-demand uplink multipoint uncoordinated interference resolution according to an example embodiment of the present invention.
Figure 8:
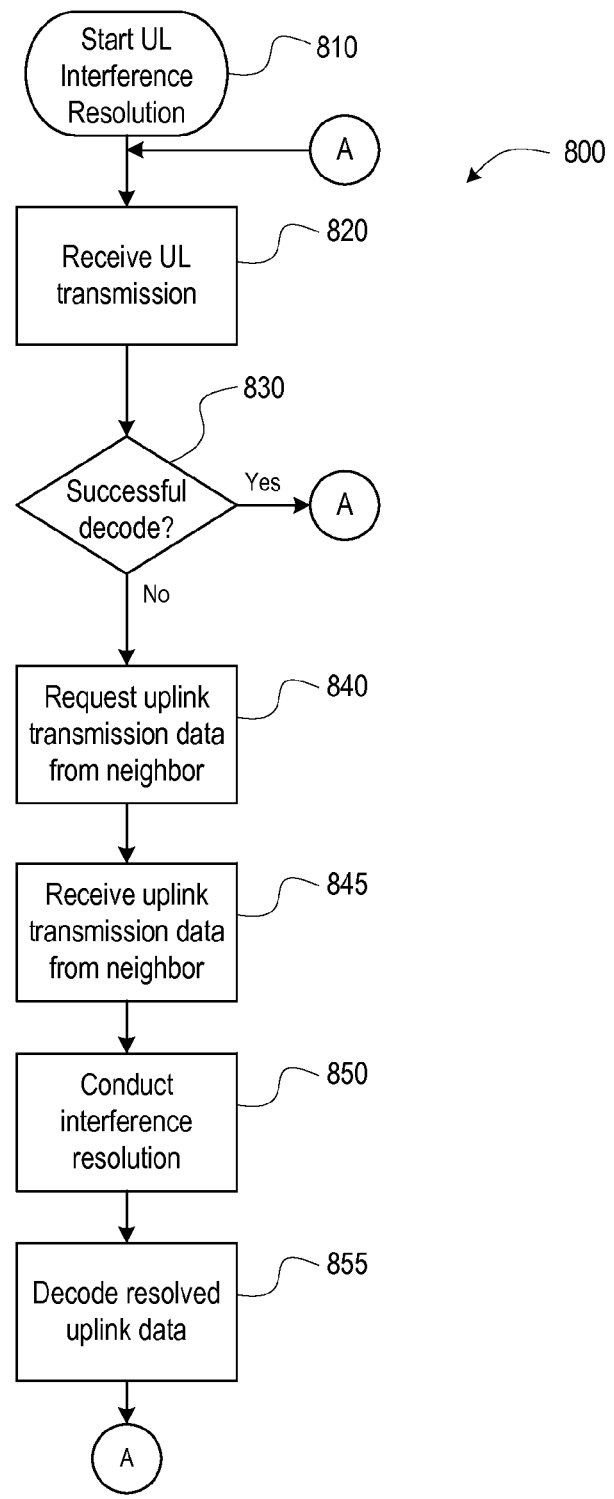
FIG. 8 is a flowchart of a method for on-demand uncoordinated uplink multipoint interference resolution according to an example embodiment of the present invention.
Figure 9:
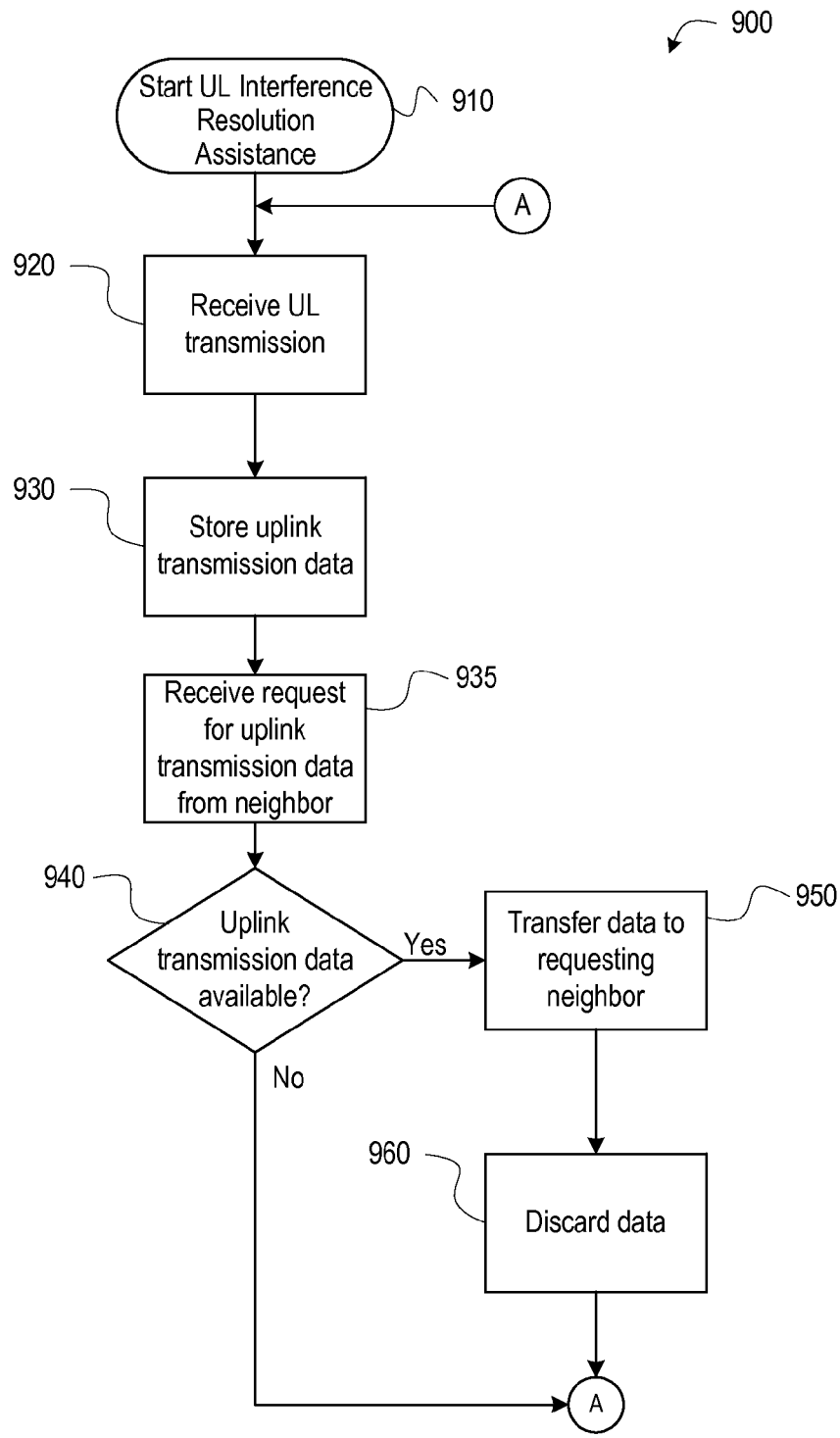
FIG. 9 is a flowchart of a method for on-demand uncoordinated uplink multipoint interference resolution assistance according to an example embodiment of the present invention.

FIG. 7 is a flowchart of a method 700 for initialization of a base station in preparation for performing on-demand unco-ordinated uplink multipoint interference resolution according to an example embodiment of the present invention. FIG. 8 is a flowchart of a method 800 for on-demand uncoordinated uplink multipoint interference resolution according to an example embodiment of the present invention. FIG. 9 is a flowchart of a method 900 for on-demand uncoordinated uplink multipoint interference resolution assistance according to an example embodiment of the present invention. These methods (or processes) may be performed, for example, using any of the base stations (macro, femto, or pico) depicted in FIG. 1, 2, 3, or 6. The base station performing method 800 may be referred to as an assisted base station, and a base station performing method 900 may be referred to as an assisting base station.

The method 700 to perform initialization starts at step 710. The method may begin, for example, after the base station has powered up. At step 720, the base station identifies its neighbors. This may be accomplished a number of ways. Some protocols allow a base station to sniff the uplink to detect neighbors. Some protocols allow a base station to ask user equipment with which the base station is communicating to detect and report neighbors. Some systems may provide neighbor information through communication with a central entity, such as central entity 605 in FIG. 6, which is cognizant of the network topology.

At step 730, the base station exchanges with its neighbors static information of use in interference resolution. This information may include, for instance, hopping sequences or information regarding reference signals. This information could alternatively be requested, on-demand, as part of the information exchanged at the time of interference resolution. This exchange could also be performed periodically or as needed when the parameters change. This information could alternatively be provided by a central entity.

After step 730, the base station operates according to one or both of two methods which may be simultaneous. The base station may proceed to method 800 (FIG. 8) where it performs on-demand uncoordinated UL multipoint interference resolution of its own received signal. Alternatively or simultaneously, the base station may proceed to method 900 (FIG. 9) where it performs on-demand uncoordinated UL multipoint interference resolution assistance to aid neighboring base stations in resolving interference of their received signals. These processes will be described below with respect to FIGS. 8 and 9.

The method 800 for performing on-demand uncoordinated UL multipoint interference resolution of FIG. 8 begins at step 810. The base station performing on-demand uncoordinated UL multipoint interference resolution may transition to step 810 from the initialization process shown in FIG. 7. At step 820, the base station receives an uplink transmission. The uplink transmission may include a transmission that the base station is scheduled to receive from a user equipment (e.g., wanted signal 635*a*) and a transmission from another user equipment (e.g., unwanted signal 645*b*). The base station derives local uplink transmission data from the received uplink transmission, for example, by processing as described for the SC-FDMA receiver 500. The base station attempts to decode the uplink transmission data. The base station can also monitor for an error indication to determine if the attempted decode is, or may be, successful. At step 830, the base station determines whether decoding is, or may be, successful, for example, based on error vector magnitude (EVM), bit error rate (BER) estimate calculation, successful decoding of forward error correction (FEC) coding, or successful checking of checksums or cyclic redundancy checks (CRC). At step 830, if the decoding was successful, the process returns to step 820; otherwise, the process proceeds to step 840.

At step 840, the base station sends a request to one or more neighboring base stations for uplink transmission data. The requested uplink transmission data may be, for example, the output of a resource demapper for the resources in question and the expected reference signals. At step 845, the base station receives the uplink transmission data from the one or more neighboring base stations. The uplink transmission data may be requested and received through a central entity.

At step 850, the base station conducts interference resolution based on its local uplink transmission data (e.g., the received signal and information the base station knows about the received signal such as an expected reference signal) and the uplink transmission data received from one or more neighboring base stations. In step 855, the base station decodes the interference resolved uplink transmission data to decode the received UL signal and produce decode uplink data. In method 800, whether the decoding attempt is successful or not, the process returns to step 820.

Information from both the base station attempting interference resolution and the base station assisting interference resolution may be passed to a central entity which may also perform all or part of the interference resolution and decoding calculations.

The method 900 for on-demand uncoordinated UL multipoint interference resolution assistance begins at step 910. The base station may transition to step 910 from the initialization process shown in FIG. 7. At step 920, the base station receives an uplink transmission. The uplink transmission may include a transmission from a user equipment that the base station is schedule to receive (e.g., wanted signal 635*b*) and a transmission from another user equipment (e.g., unwanted signal 645*a*). The base station derives local uplink transmission data from the received uplink transmission, for example, by processing as described for the SC-FDMA receiver 500.

If the base station performing on-demand uncoordinated UL multipoint interference resolution assistance as described in the flowchart of FIG. 9 is also performing on-demand uncoordinated UL multipoint interference resolution as described in the flowchart of FIG. 8, step 920 and step 820 may be combined. However, to be of additional assistance, at step 920, the base station may activate its receiver to receive an uplink signal on uplink resources even if there is no transmission from a user device expected (e.g., based on the transmission being scheduled by the base station) to use those resources and for which the receiver would not need to be activated for step 820.

The base station may utilize an assistance mode indication to determine that it should activate its receiver to receive an uplink signal on uplink resources even if there is no expected (e.g., a transmission is not scheduled by the base station) transmission from a user device on those resources. In an aspect, such an assistance mode indication may be received in the form of an assistance request from a neighboring base station. In an aspect, an assistance mode indication may be received from a network device in the network, such as central entity 605 of FIG. 6 which may be implementing a network management system. In an aspect, an assistance mode indication may be pre-provisioned in the base station and set to a permanent status, or may be time-scheduled or triggered based on network conditions, such as network congestion, noise levels, or other criteria.

After reception of an uplink signal in step 920, the process moves to step 930 where uplink transmission data is stored in a memory device, for instance in storage module 383 of FIG. 3. The stored uplink transmission data may be in any of the various forms of uplink transmission data, such as, for example, resource demapper outputs 580 and 590 of FIG. 5. At step 935, the base station receives a request for uplink transmission data from a neighboring base station. The request could be from a central entity, such as central entity 605 of FIG. 6 rather than directly from the neighboring base station.

At step 940, the base station determines if the requested uplink transmission data is available. The uplink transmission data may not be available, for example, if the base station had not stored the requested uplink transmission data (e.g., if the base station did not have an UL transmission scheduled on the relevant resources). The uplink transmission data may not be available if the request is received after a timeout period has expired and the uplink transmission data was deleted from storage. Data may also be deleted from storage to free storage space for other uses. If the requested uplink transmission data is available, the process moves to step 950; otherwise, the process returns to step 920.

In step 950, the base station transfers the requested uplink transmission data to the requesting neighbor base station. The uplink transmission data may be transferred via a central entity. At step 960, the base station may discard the transferred uplink transmission data to free storage space. Uplink transmission data may also be discarded for other reasons.

The methods described herein may be applied to any neighboring co-channel cells (e.g., coverage areas as described above) whether implemented as neighboring base stations or as neighboring cells within the same base station, for instance a sectorized base station with multiple co-channel sectors or cells. In this latter case, the information exchange is within the sectorized base station, for example, between the hardware, software, or other logic controlling the receivers corresponding to the separate sectors.

LTE Background

The LTE SC-FDMA uplink, which is OFDM with an additional FFT precoder, is divided in time into 0.5 millisecond (ms) slots. In time, a slot is comprised of 7 OFDM symbols using the normal cyclic prefix or 6 OFDM symbols using the extended cyclic prefix. In frequency, a slot is composed of some number of 15 kilohertz (kHz) subcarriers. For instance a 5 megahertz (MHz) wide channel is composed of 300 subcarriers taking 4.5 MHz of the channel bandwidth and a 10 MHz channel is composed of 600 subcarriers taking 9 MHz of the channel bandwidth, leaving a guard band between channels. Physical resource blocks (PRBs) are defined as 12 contiguous subcarriers (also referred to as frequency subchannels or subchannels) across all 6 or 7 OFDM symbols of a slot. A PRB is the smallest unit of uplink bandwidth allocation given to a UE. Physical resource blocks may also be referred to as resource blocks.

FIGS. 10, 11, 12, 13, 14, 15, and 16 are diagrams of uplink transmissions for LTE with a normal cyclic prefix (i.e., 7 OFDM symbols per 0.5 ms slot). These diagrams provide specific examples to aid in understanding the systems and methods disclosed herein. However, the disclosed systems and methods can be applied in many other scenarios including the extended cyclic prefix case and non-LTE OFDM or SC-FDMA based technology. FIGS. 11, 12, 13, 14, 15, and 16 show multiple slots. The slots are associated with different UEs in different cells. However, the cells are sufficiently synchronized that the slots can be considered simultaneous and transmissions in the slots in corresponding symbols and subchannels will be received at base stations as superimposed.

Figure 10:
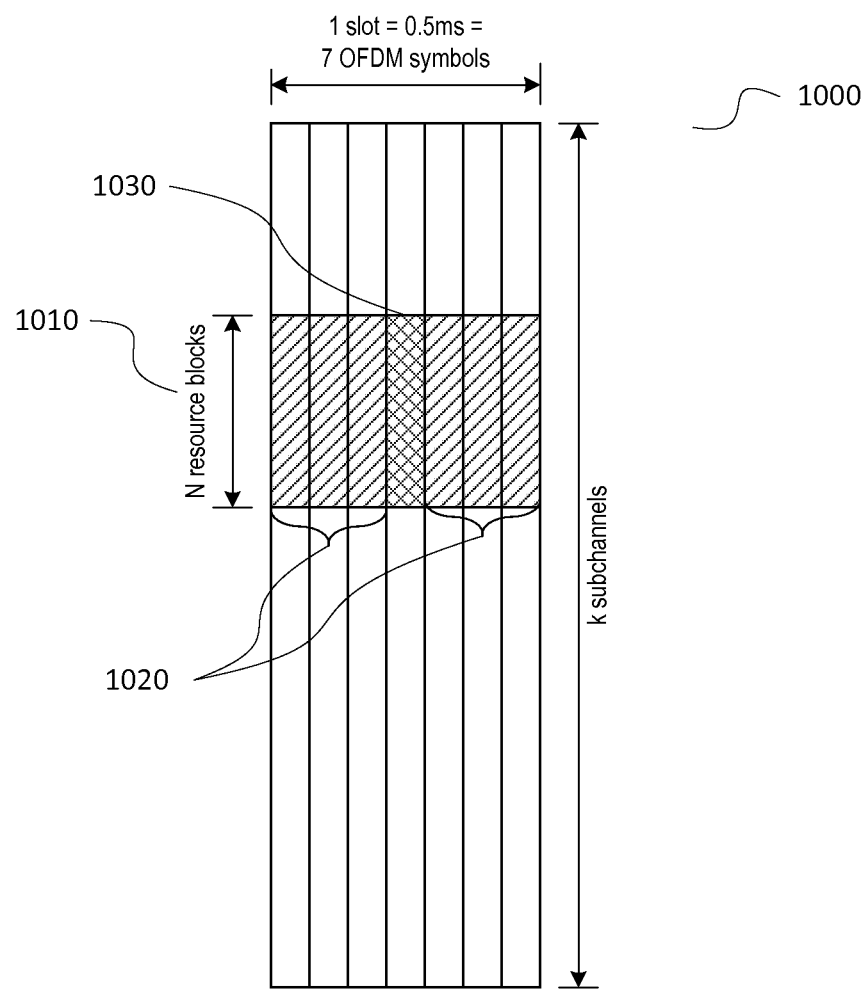
FIG. 10 is a diagram of an uplink transmission in subcarriers of a slot according to an example embodiment of the present invention.

FIG. 10 is a diagram of an uplink transmission in subcarriers of a slot according to an example embodiment of the present invention. A physical uplink shared channel (PUSCH) transmission 1010 in a slot 1000 by a first UE to a first eNodeB is shown. The PUSCH transmission 1010 spans N PRBs (12×N subcarriers in frequency and the entire slot duration in time). In LTE, the N resource blocks are allocated to be contiguous in frequency. The PUSCH transmission 1010 includes a data element 1020 in the first three and last three OFDM symbols and a reference signal 1030 in the middle OFDM symbol of the slot 1000.

Figure 11:
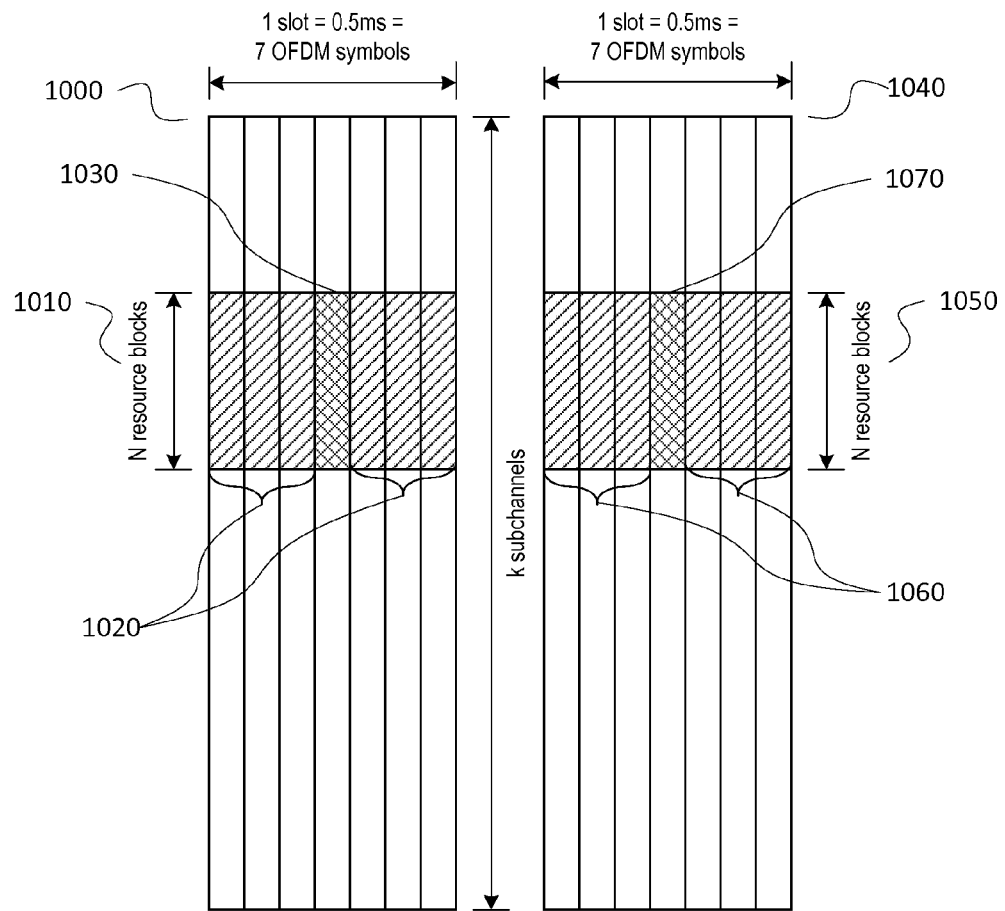
FIG. 11 is a diagram of an uplink transmission in subcarriers of a slot from one user equipment to one LTE eNodeB and an interfering LTE uplink transmission from a second user equipment to a second LTE eNodeB according to an example embodiment of the present invention.

FIG. 11 is a diagram of an uplink transmission in subcarriers of a slot from one user equipment to one LTE eNodeB and an interfering LTE uplink transmission from a second user equipment to a second LTE eNodeB according to an example embodiment of the present invention. FIG. 11 shows the same PUSCH transmission 1010 by the first UE in slot 1000 to the first eNodeB as shown in FIG. 10. FIG. 11 also shows a co-channel PUSCH transmission 1050 in slot 1040 by a second UE to a second eNodeB. Slot 1040 is coincidental in time with slot 1000. PUSCH transmission 1050 is similar to PUSCH transmission 1010 and includes data element 1060 and reference signal 1070. PUSCH transmission 1050 uses the same number of resource blocks, N, on the same subcarriers as PUSCH transmission 1010. Since PUSCH transmission 1010 and PUSCH transmission 1050 use the same set of frequency subchannels, there is interference. However, the reference signal 1070 will have been derived from a different Zadoff-Chu sequence or may be some other reference signal (e.g., a QPSK reference sequence such as described in the LTE standard) than reference signal 1030 and data element 1060 and data element 1020 likely may contain different data. Also, the transmissions may use different modulation and coding. The uplink transmissions of FIG. 11 are uniform in allocation since the PUSCH transmissions are aligned in time and frequency.

Figure 12:
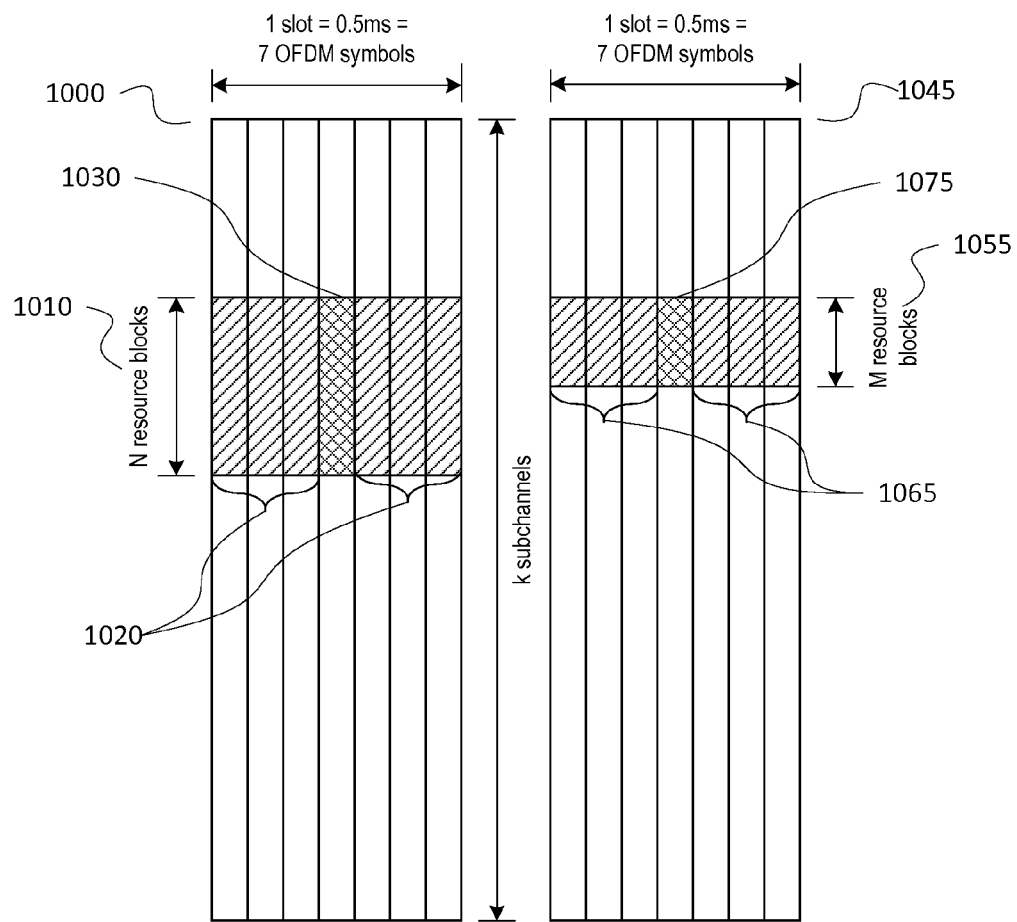
FIG. 12 is a diagram of an LTE uplink transmission in subcarriers of a slot from one user equipment to one LTE eNodeB and an interfering LTE uplink transmission from a second user equipment to a second LTE eNodeB according to an example embodiment of the present invention.

FIG. 12 is a diagram of an LTE uplink transmission in subcarriers of a slot from one user equipment to one LTE eNodeB and an interfering LTE uplink transmission from a second user equipment to a second LTE eNodeB according to an example embodiment of the present invention. FIG. 12 shows the same PUSCH transmission 1010 by the first UE in slot 1000 to the first eNodeB as shown in FIG. 10. FIG. 12 also shows a co-channel PUSCH transmission 1055 in slot 1045 from a second UE to a second eNodeB. Slot 1045 is coincidental in time with slot 1000. PUSCH transmission 1055 is similar to PUSCH transmission 1010 and includes data element 1065 and reference signal 1075. The number of resource blocks, M (12×M subcarriers), in PUSCH transmission 1055 is fewer than in PUSCH transmission 1010 but the resource blocks in PUSCH transmission 1055 overlap with the resource blocks in PUSCH transmission 1010, causing interference. In addition to PUSCH transmission 1055 and PUSCH transmission 1010 being different lengths, reference signal 1075 will have been derived from a different Zadoff-Chu sequence or may be some other reference signal (e.g., a QPSK reference sequence such as described in the LTE standard) than reference signal 1030 and data element 1065 and data element 1020 likely may contain different data. Also, the transmissions may use different modulation and coding. In addition, depending on the choice of N and M, one or both of reference signals 1030 and 1075 may be QPSK references signals. Since N and M are different, the derivation of reference signals 1030 and 1075 may be different.

Figure 13:
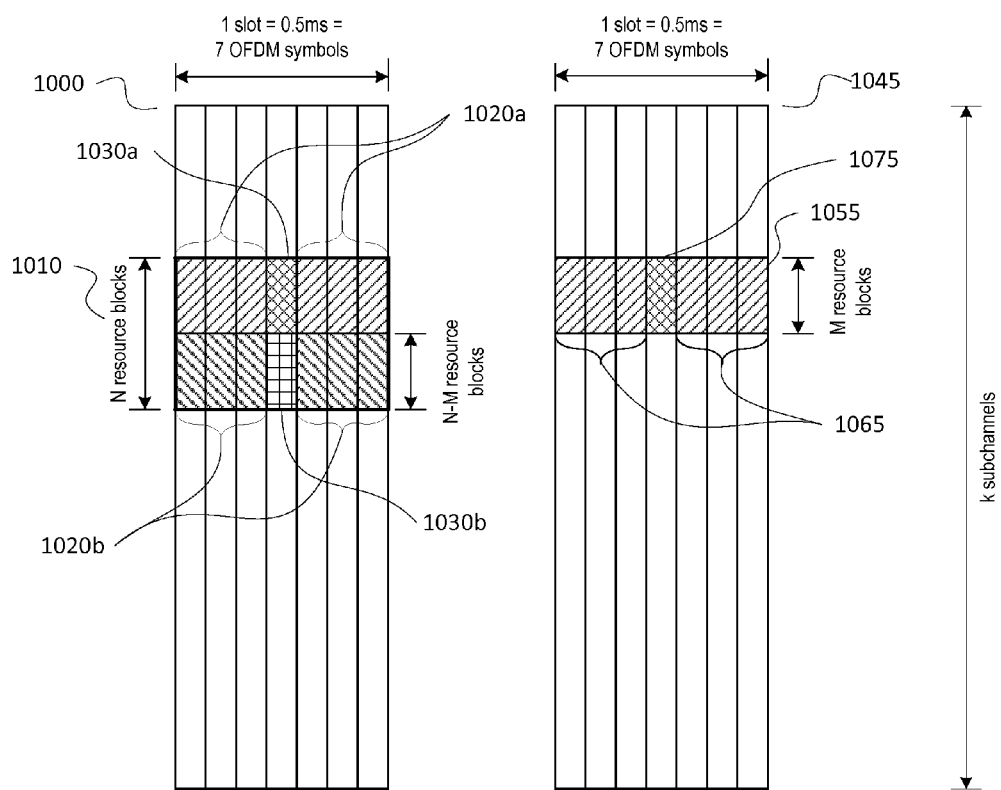
FIG. 13 is a diagram of an LTE uplink transmission in subcarriers of a slot from one user equipment to one LTE eNodeB and an interfering LTE uplink transmission in the same slot from a second user equipment to a second LTE eNodeB according to an example embodiment of the present invention.

FIG. 13 is a diagram of an LTE uplink transmission in subcarriers of a slot from one user equipment to one LTE eNodeB and an interfering LTE uplink transmission in the same slot from a second user equipment to a second LTE eNodeB according to an example embodiment of the present invention. FIG. 13 shows the same PUSCH transmissions as shown in FIG. 12. In FIG. 13 the labeling of data element and reference signal portions of PUSCH transmission 1010 are made in a more detailed manner than in FIG. 12.

The first M resource blocks of the PUSCH transmission 1010 and the M resource blocks of PUSCH transmission 1055 overlap both in time and frequency. The portion of data element 1020 that overlaps with data element 1065 of PUSCH transmission 1055 is referred to as "First Interfered Data Portion" 1020*a*. The portion of the reference signal 1030 that overlaps with reference signal 1075 of PUSCH transmission 1055 is referred to as "First Interfered RS Portion" 1030*a*. The portion of data element 1020 that does not overlap with data element 1065 of PUSCH transmission 1055, comprising N–M resource blocks, is referred to as "Second Interfered Data Portion" 1020*b*. The portion of reference signal 1030 that does not overlap with reference signal 1075 of PUSCH transmission 1055 is referred to as "Second Interfered RS Portion" 1030*b*. Data element 1065 may also be referred to as "First Interfering Data Portion," and reference signal 1075 may also be referred to as "First Interfering RS Portion."

Figure 14:
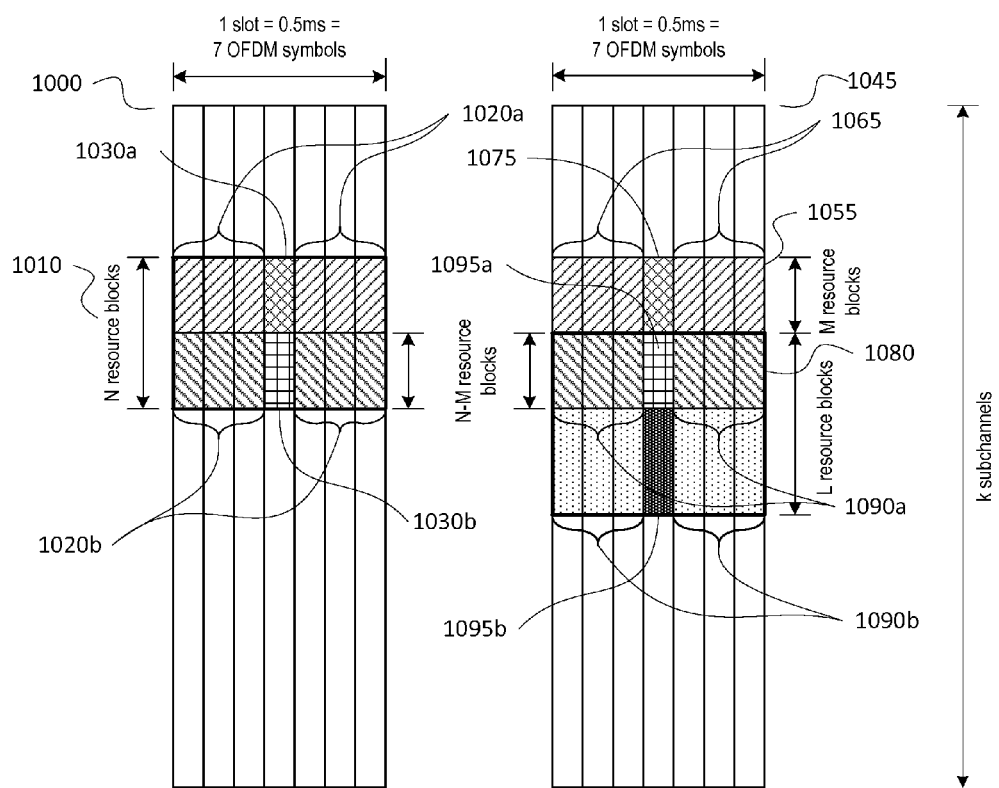
FIG. 14 is a diagram of an LTE uplink transmission in subcarriers of a slot from one user equipment to one LTE eNodeB and an interfering LTE uplink transmissions in the same slot from each of a second user equipment and a third user equipment to a second LTE eNodeB according to an example embodiment of the present invention.

FIG. 14 is a diagram of an LTE uplink transmission in subcarriers of a slot from one user equipment to one LTE eNodeB and an interfering LTE uplink transmissions in the same slot from each of a second user equipment and a third user equipment to a second LTE eNodeB according to an example embodiment of the present invention. The uplink transmissions show in FIG. 14 are similar to those shown in FIG. 13. FIG. 14 includes an additional co-channel PUSCH transmission 1080 in slot 1045 by a third UE to the second eNodeB. PUSCH transmission 1080 has a similar structure to the other PUSCH transmissions and includes data element 1090 and reference signal 1095. However, the number of resource blocks, L (12×L subcarriers across all OFDM symbols of a slot), in PUSCH transmission 1080 is greater than the N–M resource blocks in Second Interfered Data Portion 1020*b* of PUSCH transmission 1010. Portions of PUSCH transmission 1080 overlap with Second Interfered Data Portion 1020*b* of PUSCH transmission 1010 causing interference. The reference signal 1095 may have been derived from a different Zadoff-Chu sequence or may be a QPSK reference sequence than reference signal 1030, the data element 1090 may contain different data than data element 1020, and different modulation and coding may be used.

PUSCH transmission 1055 overlaps both in time and frequency with the first M resource blocks of PUSCH transmission 1010. The next N–M resource blocks of PUSCH transmission 1010 overlap in both time and frequency with the first N–M resource blocks of PUSCH transmission 1080. The portion of the data element 1090 that overlaps with Second Interfered Data Portion 1020*b* of PUSCH transmission 1010 is referred to as "Second Interfering Data Portion" 1090*a*. The portion of reference signal 1095 that overlaps with Second Interfered RS Portion 1030*b* is referred to as "Second Interfering RS Portion" 1095*a*. The portion of the data element 1090 that does not overlap with Second Interfered Data Portion 1020*b* of PUSCH transmission 1010 is referred to as "Third Interfering Data Portion" 1090*b*. The portion of reference signal 1095 that does not overlap with Second Interfered RS Portion 1030*b* is referred to as "Third Interfering RS Portion" 1095*b*.

Figure 15:
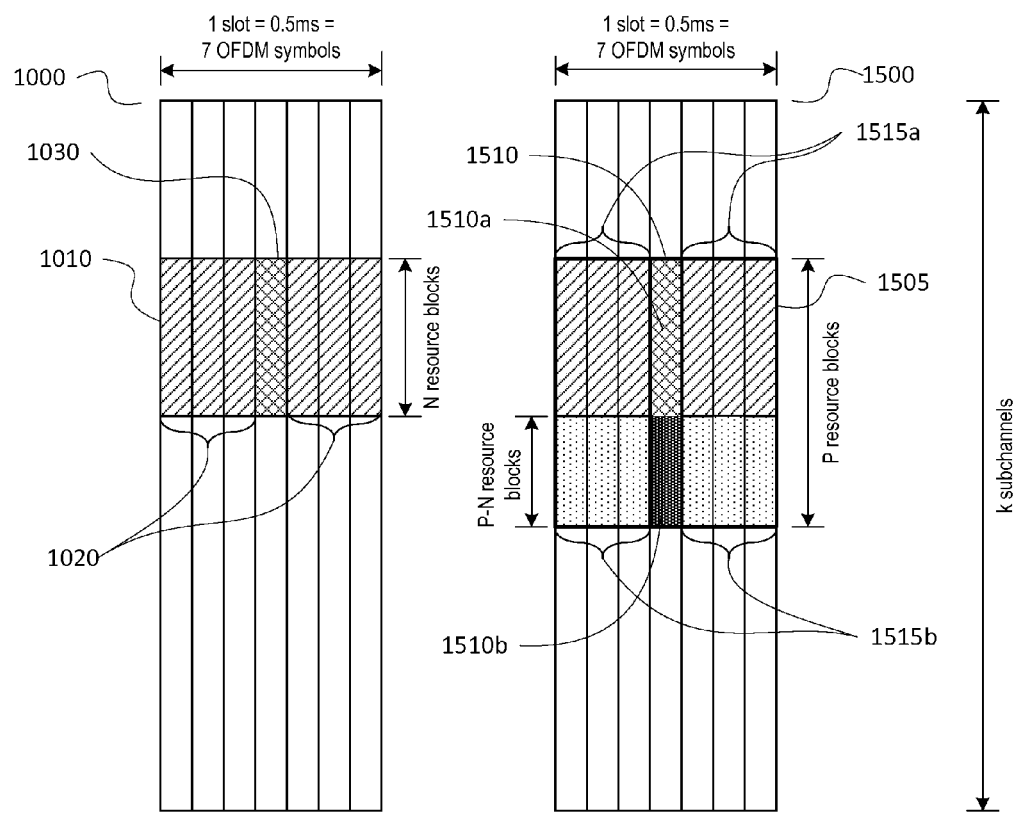
FIG. 15 is a diagram of an LTE uplink transmission in subcarriers of a slot from one user equipment to one LTE eNodeB and an interfering LTE uplink transmission in the same slot from a second user equipment to a second LTE eNodeB according to an example embodiment of the present invention.

FIG. 15 is a diagram of an LTE uplink transmission in subcarriers of a slot from one user equipment to one LTE eNodeB and an interfering LTE uplink transmission in the same slot from a second user equipment to a second LTE eNodeB according to an example embodiment of the present invention. FIG. 15 shows the same PUSCH transmission 1010 in slot 1000 by a first UE to a first eNodeB as shown in FIGS. 10, 11, 12, 13, and 14. FIG. 15 also shows a co-channel PUSCH transmission 1505 in slot 1500 by a second UE to a second eNodeB. Slot 1000 and slot 1500 are coincidental in time, making PUSCH transmission 1010 and PUSCH transmission 1505 coincidental in time. PUSCH transmission 1505 has a similar structure as PUSCH transmission 1010 and includes a data element 1515 and a reference signal 1510. However, the number of resource blocks in PUSCH transmission 1505, P (12×P subcarriers across all OFDM symbols in a slot), is larger than the number of resource blocks, N (12×N subcarriers across all OFDM symbols in a slot) in PUSCH transmission 1010 and overlap, causing interference.

In addition to PUSCH transmission 1505 and PUSCH transmission 1010 being different lengths, the reference signal 1510 may have been derived from a different Zadoff-Chu sequence or may be a different QPSK reference sequence than was used for reference signal 1030, the data element 1515 may contain different data than data element 1020, and different modulation and coding may be used. In addition, depending on the choice of N and P, one or both of reference signal 1030 and reference signal 1510 may be QPSK references signals. Since N and P are different, the derivation of reference signals 1030 and 1510 may be different.

In FIG. 15, the labeling of data element and reference signal portions of PUSCH transmission 1505 are made in a detailed manner. The portion of data element 1515 that overlaps with data element 1020 of PUSCH transmission 1010 is referred to as "Fourth Interfering Data Portion" 1515a. The portion of reference signal 1510 that overlaps with reference signal 1030 is referred to as "Fourth Interfering RS Portion" 1510a. The portion of the data element 1515 that does not overlap with data element 1020 of PUSCH transmission 1010 is referred to as "Fifth Interfering Data Portion" 915b. The portion of reference signal 1510 that does not overlap with reference signal 1030 is referred to as "Fifth Interfering RS Portion" 1510b.

Figure 16:
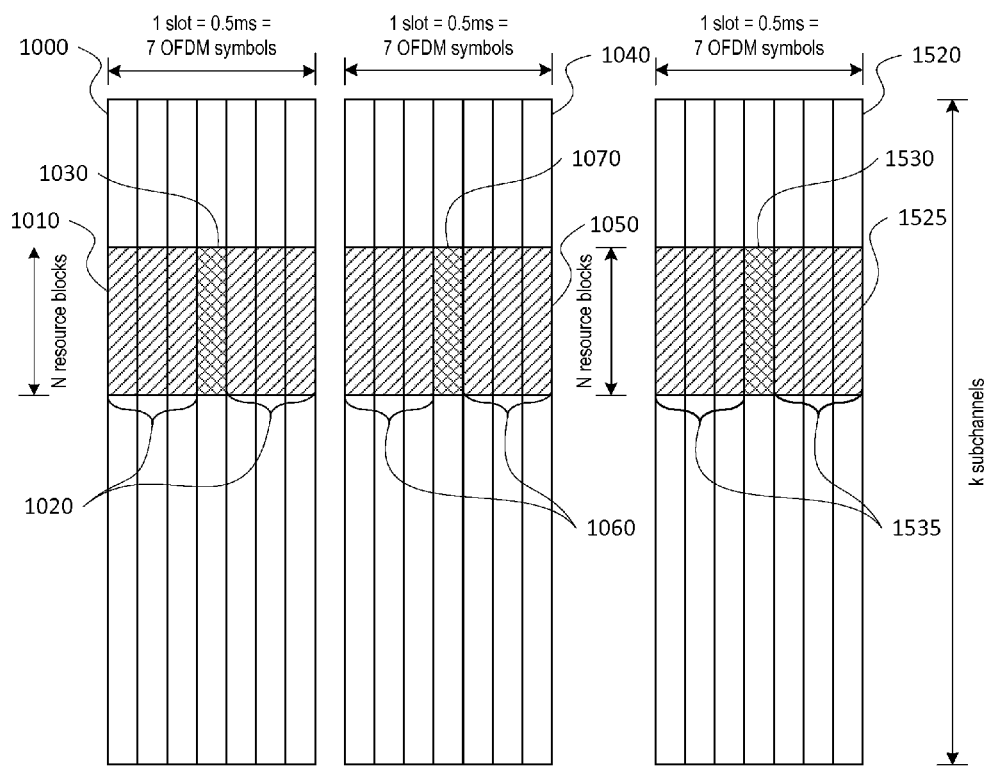
FIG. 16 is a diagram of an LTE uplink transmission in subcarriers of a slot from one user equipment to one LTE eNodeB, an interfering LTE uplink transmission from a second user equipment to a second LTE eNodeB, and an interfering LTE uplink transmission from a third user equipment to a third LTE eNodeB according to an example embodiment of the present invention.

FIG. 16 is a diagram of an LTE uplink transmission in subcarriers of a slot from one user equipment to one LTE eNodeB, an interfering LTE uplink transmission from a second user equipment to a second LTE eNodeB, and an interfering LTE uplink transmission from a third user equipment to a third LTE eNodeB according to an example embodiment of the present invention. The transmissions shown in FIG. 16 are similar to those shown in FIG. 11, including PUSCH transmission 1010 in slot 1000 by a first UE to a first eNodeB and co-channel PUSCH transmission 1050 in slot 1040 by a second UE to a second eNodeB. FIG. 16 also shows a co-channel PUSCH transmission 1525 in slot 1520 from a third UE to a third eNodeB. Slot 1520 is coincidental in time with slot 1000 and slot 1040. PUSCH transmission 1525 has a similar structure as PUSCH transmission 1010 and PUSCH transmission 1050 and includes data element 1535 and reference signal 1530. PUSCH transmission 1525 uses the same number of resource blocks, N, on the same subcarriers as PUSCH transmission 1010, causing interference. However, the reference signal 1530 will have been derived from a different Zadoff-Chu sequence or may be some other reference signal (e.g., a QPSK reference sequence such as described in the LTE standard) than reference signal 1030 and data element 1535 and data element 1020 likely may contain different data. Also, the transmissions may use different modulation and coding.

Processes for Interference Resolution

Processes for interference resolution will be described with reference to the communication system of FIG. 6, the SC-FDMA receiver of FIG. 5, and the transmission diagrams of FIGS. 11, 12, 13, 14, 15, and 16. These descriptions provide specific examples to aid understanding, but the processes can be broadly applied.

In a first process for interference resolution, the assisted access node and assisting access node receive transmissions from a first UE and a second UE that use a same set of frequency subchannels in a same slot.

The received uplink transmission can be analyzed to estimate a channel that includes the radio channel and portions of the UE transmitter and base station receiver. The channel can be analyzed, for example, at the received frequency-domain resource element values (FFT output 585) in the SC-FDMA receiver 500 of FIG. 5. In another aspect, the channel can be analyzed, for example, at the demapper outputs 580 and 590 of FIG. 5.

In a single input single output (SISO) model of the channel between a transmitter and a receiver, the channel transfer functions per resource element (one subcarrier of one OFDM symbol) are multiplicative scalars. At the first base station 675a receiving wanted signal 635a from the first UE 650a and unwanted signal 645b from the second UE 650b, the channel output at OFDM symbol index i and subcarrier index j is given as, $$y_{i,j} = h_{i,j}^d x_{i,j}^d + h_{i,j}^u x_{i,j}^u n_{i,j} \qquad (1)$$

Where $y_{i,j}$ is the 1×1 (scalar) channel output (e.g., data elements 590); $x_{i,j}^d$ is the 1×1 frequency domain resource element value from wanted signal 635a from the desired first UE 650a; $h_{i,j}^d$ is the 1×1 channel transfer function between the desired first UE 650a and the receiver of the first base station 675a; $x_{i,j}^u$ is the 1×1 frequency domain resource element value from interfering second UE 650b; $h_{i,j}^u$ is the 1×1 channel transfer function between the interfering second UE 650b and the receiver of the first base station 675a; and $n_{i,j}$ is a 1×1 noise value. The result, $\hat{x}_{i,j}^d$, of trying to solve for $x_{i,j}^d$ may be impaired by interference of the unwanted signal 645b from interfering second UE 650b and noise.

If interference and noise are within bounds, error tolerance and correction in demodulation and decoding allow the first base station 675a to properly reconstruct the original input data, $x_{i,j}^d$, from $\hat{x}_{i,j}^d$. If the original data cannot be reconstructed, additional information within communication system 600 may be used to properly reconstruct the original input data.

The received signal at neighboring second base station 675b can be written as $$y'_{i,j} = h_{i,j}^{d'} x_{i,j}^d + h_{i,j}^{u'} x_{i,j}^u + n'_{i,j} \qquad (2)$$

where $y'_{i,j}$ is the 1×1 channel output; $h_{i,j}^{d'}$ is the 1×1 channel transfer function between the desired first UE 650a and the receiver of the neighboring second base station 675b; $h_{i,j}^{u'}$ is the 1×1 channel transfer function between the interfering second UE 650b and the receiver of the neighboring second base station 675b; and $n'_{i,j}$ is a 1×1 noise value.

Availability to the first base station 675a of the signal received by the neighboring second base station 675b has the potential of significantly increasing the decoding performance at the first base station 675a. To facilitate this, the first base station 675a is operated as described in method 800 of FIG. 8 and the neighboring second base station 675b is operated as described in method 900 of FIG. 9. Note that they may also simultaneously operate such that the first base station 675a is assisting the neighboring second base station 675b on an on-demand basis.

For each UL transmission received in a slot, the neighboring second base station 675b stores local uplink transmission data, for example, its received frequency domain data elements, $y'_{i,j}$ (e.g. data elements 590) and both received and expected reference signal. For each UL transmission received in a slot that first base station 675a attempts to decode but cannot, first base station 675a requests the frequency domain data elements $y'_{i,j}$ and received and expected reference signals for UL transmissions received by neighboring second base station 675b that overlap the un-decodable UL transmission. In response to a request received from first base station 675a, the neighboring second base station 675b may send its local uplink transmission data for the UL transmissions it received that overlap the UL transmission subcarriers as requested by the first base station 675a.

The neighboring second base station 675b may store and communicate its local uplink transmission data in various forms. The local uplink transmission data may include the received frequency domain data elements for the data element portion of the transmission and received and expected values for the reference signal portion of the transmission. Alternatively, the neighboring second base station 675b sends first base station 675a the output of the FFT (some or all subcarriers) for all OFDM symbols and lets it extract the frequency domain data elements $y'_{i,j}$ from the demapper. Alternatively, in an aspect, the neighboring second base station 675b may send first base station 675a information sufficient to create the expected reference signals rather than the actual expected reference signals.

With local uplink transmission data from the neighboring second base station 675b, the decoding ambiguity introduced by the interference element, $h_{i,j}^u x_{i,j}^u$ of equation (1) can be substantially reduced.

The interference resolution process is further explained using equation (3), which is the two-dimensional mathematical model obtained by aggregating equations (1) and (2).

$$\begin{bmatrix} y_{i,j} \\ y'_{i,j} \end{bmatrix} = \begin{bmatrix} h_{i,j}^d & h_{i,j}^u \\ h_{i,j}^{d'} & h_{i,j}^{u'} \end{bmatrix} \begin{bmatrix} x_{i,j}^d \\ x_{i,j}^u \end{bmatrix} + \begin{bmatrix} n_{i,j} \\ n'_{i,j} \end{bmatrix} \triangleq Y_{i,j} \quad (3)$$
$$= H_{i,j} X_{i,j} + N_{i,j}$$

Where $H_{i,j}$ is the channel transfer function matrix; $Y_{i,j}$ is the output vector; $X_{i,j}$ is the input vector; and $N_{i,j}$ is the noise vector.

First base station 675a desires to resolve $x_{i,j}^d$, the frequency domain resource element value from wanted signal 635a, and can conduct interference resolution based on its local uplink transmission data and the neighbor uplink transmission data received from neighboring second base station 675b to obtain resolved uplink transmission data. As described above, first base station 675a knows $y_{i,j}, y'_{i,j}$, and an estimate of $h_{i,j}^d$ from a combination of the functionality of its receiver and the uplink transmission data received from the neighboring second base station 675b. With the expected reference signal from the neighboring second base station 675b, the first base station 675a has enough information to estimate the channel transfer function matrix H in equation (3).

For interference resolution, the first base station 675a can calculate the estimated channel transfer functions, as shown below, for example:
- $h_{11}$ by correlating the reference signal extracted by the receiver of first base station 675a with the reference signal it expected to be used by the first UE 650a.
- $h_{12}$ by correlating the reference signal extracted by the receiver of first base station 675a with the reference signal that neighboring second base station 675b expected to be used by the second UE 650b.
- $h_{21}$ by correlating the reference signal extracted by neighboring second base station 675b with the reference signal it expected to be used by the first UE 650a.
- $h_{22}$ by correlating the reference signal extracted by neighboring second base station 675b with the reference signal that neighboring second base station 675b expected to be used by the second UE 650b.

These calculations (and other related or similar calculations) may be referred to collectively or individually as a correlation procedure.

First base station 675a then has output matrix $Y_{i,j}$, and $\hat{H}$, an estimate of the channel transfer function matrix $H_{i,j}$. The estimated channel transfer function matrix, $\hat{H}$, is formed as shown in equation (4) from the components calculated in the correlation procedure.

$$\hat{H} = \begin{bmatrix} h_{11} & h_{12} \\ h_{21} & h_{22} \end{bmatrix} \quad (4)$$

The estimated channel transfer function matrix, $\hat{H}$ can be used to obtain the equalized and joint estimate $\hat{X}_{i,j}$ for $$X_{i,j} = \begin{bmatrix} x_{i,j}^d \\ x_{i,j}^u \end{bmatrix}$$

as shown in equation (5). This calculation of $\hat{X}_{i,j}$ may be referred to as zero forcing.

$$\hat{X}_{i,j} = \hat{H}^{-1} Y_{i,j} = \hat{H}^{-1} H_{i,j} X_{i,j} + \hat{H}^{-1} N_{i,j} \quad (5)$$

If interference and noise are within bounds, error tolerance and correction in demodulation and decoding allow the first base station 675a to properly reconstruct the original input data from the impaired version of $X_{i,j}^d$ in $\hat{X}$.

The estimated channel transfer function matrix, $\hat{H}$ may be obtained over an entire OFDM or SC-FDMA uplink transmission attributable to a UE, as in the above example, where one estimated channel transfer function matrix is used the entire range of symbol index i and subcarrier index j of the uplink transmission. Alternatively, a number of different $\hat{H}$ matrices may be obtained over one or more subsets of such a transmission. An obtained $\hat{H}$ matrix may be used for the entire OFDM or SC-FDMA region of interest, or for a subset of the region or for individual resource elements. That is, different $\hat{H}$ matrices may be obtained and used for different resource elements or any subset of an OFDM or SC-FDMA transmission.

A second process for interference resolution is similar to the first process described above. In the second process for interference resolution, the assisting access node calculates part of the estimated channel transfer function matrix $\hat{H}$ and supplies this information to the assisted access node. The neighboring second base station 675b estimates channel transfer function $h_{i,j}^{d_1}$ creating $h_{21}$ by using information that it has obtained about the reference signal used by the first UE 650a. The neighboring second base station 675b estimates channel transfer function $h_{i,j}^{u_1}$ creating $h_{22}$ by correlating the reference signal it extracted with the expected reference signal associated with the second UE 650b. The neighboring second base station 675b can furnish the transfer function estimates $h_{21}$ and $h_{22}$, to first base station 675a on request along with $y'_{i,j}$ and the expected reference signal transmitted by the second UE 650b. First base station 675a calculates $h_{11}$ and $h_{12}$ as described above and then has two equations relating $x_{i,j}^u$ and $x_{i,j}^d$ and thus it can obtain detected values for $\hat{x}_{i,j}^u$ and $\hat{x}_{i,j}^d$ using equations (4) and (5).

A third process for interference resolution is similar to the second process described above. In the third process, when the first base station 675a requests information from the neighboring second base station 675b, the first base station 675a includes the expected reference signal associated with the first UE 650a or information enabling the determination of the expected reference signal. This allows the neighboring second base station 675b to make an estimate of channel transfer function $h_{i,j}^{d_1}$, creating $h_{21}$ by correlating the reference signal it extracted with the expected reference signal associated with the first UE 650*a* received from the first base station 675*a*. Then, as in the second process, the neighboring second base station 675*b* estimates channel transfer function $h_{i,j}{}^u$, creating $h_{22}$, and furnishes the transfer function estimates $h_{21}$ and $h_{22}$ to first base station 675*a* along with $y'_{i,j}$ and the expected reference signal transmitted by second UE 650*b* or information enabling the determination of that expected reference signal. First base station 675*a* calculates $h_{11}$ and $h_{12}$ as described above and then has two equations relating $x_{i,j}{}^u$ and $x_{i,j}{}^d$ from which it can obtain detected values for $\hat{x}_{i,j}{}^u$ and $\hat{x}_{i,j}{}^d$ using equations (4) and (5).

A fourth process for interference resolution is similar to the processes described above. In the fourth process, when first base station 675*a* requests uplink transmission data from the neighboring second base station 675*b*, the neighboring second base station 675*b* returns for each i, j its detected value $\hat{x}_{i,j}{}^u$ for $x_{i,j}{}^u$, the frequency domain resource element value from interfering second UE 650*b*, for the interfered resource elements. The neighboring second base station 675*b* also returns the reference signal that neighboring second base station 675*b* expected to be used by the second UE 650*b* or information enabling the determination of the reference signal. These data may have been stored by neighboring second base station 675*b*, for instance as shown in step 930 of method 900 of FIG. 9.

First base station 675*a* calculates $h_{11}$ and $h_{12}$ as described above. For each resource element i, j, the first base station 675*a* uses $y_{i,j}$ the 1×1 channel output (e.g., data elements 590), $\hat{x}_{i,j}{}^u$, $h_{11}$, and $h_{12}$ to calculate $\hat{x}_{i,j}{}^d$ as shown in equation (6).

$$\hat{x}_{i,j}^d = \frac{(y_{i,j} - h_{12}\hat{x}_{i,j}^u)}{h_{11}} \quad (6)$$

A fifth process for interference resolution is similar to the processes described above. The fifth process may be used when there are partially overlapping uplink transmissions, for example, as shown in FIG. 13, which the process will be described with reference to. For the M resource blocks in the First Interfered Data Portion 1020*a* and the First Interfered RS Portion 1030*a*, the channel output of the first base station 675*a* at OFDM symbol index i and subcarrier index j is given by equation (1).

Since, in this scenario, there is no transmission from a UE interfering with the N–M resource blocks in the Second Interfered Data Portion 1020*b* and the Second Interfered RS Portion 1030*b*, the channel output at OFDM symbol index i and subcarrier index j for these resource blocks is as shown in equation (7).

$$y_{i,j} = h_{i,j}^d x_{i,j}^d + n_{i,j} \quad (7)$$

The received signal at the neighboring second base station 675*b* in PUSCH transmission 1055 can be written as shown in equation (2).

For each UL transmission that first base station 675*a* attempts to decode but cannot, first base station 675*a* requests uplink transmission data from the neighboring second base station 675*b*. The uplink transmission data can be in the various forms as described for other interference resolution processes. The uplink transmission data of interest here is for UL transmissions received by neighboring second base station 675*b* that overlap the undecodable UL transmission, for example, from the First Interfering Data Portion 1065 and the First Interfering RS Portion 1075.

The first base station 675*a* may resolve interference for the First Interfered Data Portion 1020*a*, separately from resolving interference for the Second Interfered Data Portion 1020*b*. As described above, first base station 675*a* knows $y_{i,j}$ from its receiver and $y'_{i,j}$ from uplink transmission data from neighboring second base station 675*b*. First base station 675*a* can estimate the channel transfer function matrix H, obtaining $\hat{H}$ as shown in equation (4). The first base station 675*a* can estimate the channel transfer function matrix H using the expected reference signal from neighboring second base station 675*b* and its local information.

Similar to the first process, the first base station 675*a* can, for example, calculate:

- $h_{11}$ by correlating the reference signal extracted by its receiver for the First Interfered RS Portion 1030*a* with the same length (M×12 subchannels in the example of FIG. 13) corresponding portion of the reference signal that first base station 675*a* expected to be used by the first UE 650*a* for the First Interfered RS Portion 1030*a*.
- $h_{12}$ by correlating the same length corresponding portion of the reference signal extracted by its receiver for the First Interfered RS Portion 1030*a* with the reference signal that neighboring second base station 675*b* expected to be used by the second UE 650*b* for the First Interfering RS Portion 1075.
- $h_{21}$ by correlating the reference signal extracted by the neighboring second base station 675*b* for the First Interfering RS Portion 1075 with the same length corresponding portion of the reference signal the first base station 675*a* expected to be used by the first UE 650*a* for the First Interfered RS Portion 1030*a*.
- $h_{22}$ by correlating the reference signal extracted by the neighboring second base station 675*b* for the First Interfering RS Portion 1075 with the reference signal that neighboring second base station 675*b* expected to be used by the second UE 650*b* for the First Interfering RS Portion 1075.

Alternatively, first base station 675*a* may calculate $h_{11}$ by correlating the received version of full reference signal 1030, composed of 1030*a* and Second Interfered RS Portion 1030*b*, that is extracted by its receiver with the full length reference signal it expected to be used by first UE 650*a*. Using the full reference signal may be easier to implement or may provide improved performance in some receiver architectures.

Alternatively or additionally, first base station 675*a* may calculate $h_{21}$ by correlating the full length reference signal composed of the received version of reference signal 1075 and the reference signal resource elements from the additional N–M resource blocks which overlap Second Interfered RS Portion 1030*b*, extracted by the neighboring second base station 675*b*, with the full length reference signal expected to be used by the first UE 650*a*. This requires neighboring second base station 675*b* to also store and provide upon request to first base station 675*a* the local uplink transmission data for the additional N–M resource blocks which overlap Second Interfered RS Portion 1030*b*. Alternatively, in the request for information, first base station 675*a* may provide neighboring second base station 675*b* with the full length reference signal expected to be used by the first UE 650*a*, or a means of constructing it. In this alternative, neighboring second base station 675*b* calculates and returns $h_{21}$.

For the First Interfered Data Portion 1020*a*, the first base station 675*a* now has output vector $Y_{i,j}$ and $\hat{H}$, an estimate of channel transfer function matrix H. The estimated channel transfer function matrix $\hat{H}$ can then be used to obtain the equalized joint estimate $\hat{X}_{i,j}$ for $$X_{i,j} = \begin{bmatrix} x_{i,j}^d \\ x_{i,j}^u \end{bmatrix}$$

as shown in equation (5).

In a variation of this interference resolution process, when first base station 675a requests information from neighboring second base station 675b, neighboring second base station 675b returns for each i, j its detection value $\hat{x}_{i,j}^u$ for $x_{i,j}^u$, the equalized received frequency domain resource element values for First Interfering Data Portion 1065 from interfering second UE 650b. First base station 675a calculates $h_{11}$ and $h_{12}$ as described above. For each resource element i, j, the first base station 675a uses $y_{i,j}$ the 1×1 channel output $\hat{x}_{i,j}^u$ in place of $x_{i,j}^u$, $h_{11}$ and $h_{12}$, allowing the calculation of $\hat{x}_{i,j}^d$ through interference cancellation as shown in equation (6).

For decoding the Second Interfered Data Portion 1020b, which in this scenario has not been interfered by a UE communicating with the neighboring second base station 675b, $h_{i,j}^d$ is needed to resolve the channel. The first base station 675a calculates an estimate $h_{11}$ of $h_{i,j}^d$ by correlating the reference signal extracted (e.g., 580) by its receiver with the same length corresponding portion of the reference signal it expected to be used by the first UE 650a for the Second Interfered RS Portion 1030b. Estimated channel transfer function $h_{11}$ can be used to obtain the equalized estimate $\hat{x}_{i,j}^d$ of $x_{i,j}^d$ as shown in equation (8).

$$\hat{x}_{i,j}^d = h_{11}^{-1} y_{i,j} \quad (8)$$

As described above with respect to decoding the First Interfered Data Portion 1020a, for some receiver architectures it may be easier or provide improved performance for the first base station 675a to calculate $h_{11}$ by correlating the received version of full reference signal 1030, composed of 1030a and 1030b, that is extracted by its receiver with the full length reference signal it expected to be used by the first UE 650a. The resulting estimated channel transfer function $h_{11}$ can be used to obtain the equalized estimate $\hat{x}_{i,j}^d$ of $x_{i,j}^d$ as shown in equation (8).

For further assistance in decoding the Second Interfered Data Portion 1020b, the first base station 675a may request from the neighboring second base station 675b the reference signal resource elements from the additional N–M resource blocks which overlap the Second Interfered RS Portion 1030b. The first base station 675a may calculate $h_{21}$ by correlating the reference signal resource elements from the additional N–M resource blocks, received by neighboring second base station 675b, which overlap the Second Interfered RS Portion 1030b with the same length corresponding portion of the reference signal it expected to be used by the first UE 650a. As described above, $h_{21}$ may be calculated by neighboring second base station 675b. The first base station 675a may also request from the neighboring second base station 675b the data portion resource elements $y'_{i,j}$ from the additional N–M resource blocks which overlap the Second Interfered Data Portion 1020b. Channel transfer function estimate $h_{21}$ along with data portion resource elements $y'_{i,j}$ from the additional N–M resource blocks which overlap the Second Interfered Data Portion 1020b may be used in equation (9), which is an extension of equation (8).

$$\hat{x}_{i,j}^d = h_{11}^{-1} y_{i,j} + h_{21}^{-1} y'_{i,j} \quad (9)$$

If interference and noise are within bounds, error tolerance and correction in demodulation and decoding allow the first base station 675a to properly reconstruct the original input data for the data elements i, j corresponding to the First Interfered Data Portion 1020a and the Second Interfered Data Portion 1020b from the $\hat{x}_{i,j}^d$, the impaired estimates of the $x_{i,j}^d$.

The method of resolving Second Interfered Data Portion 1020b can also be used in the case where there is no First Interfered Data Portion 1020a, that is to say when M=0.

As an alternative to resolving decoding ambiguity in the First Interfered Data Portion 1020a and the Second Interfered Data Portion 1020b separately, they may be processed together. In this case, $h_{12}$, $h_{21}$, and $h_{22}$ are calculated using one of the methods described above for individual processing of First Interfered Data Portion 1020a, and $h_{11}$ is calculated using one of the methods described above for individual processing of either of First Interfered Data Portion 1020a or of Second Interfered Data Portion 1020b. If the First Interfered Data Portion 1020a and the Second Interfered Data Portion 1020b are processed together, data portion resource elements $y'_{i,j}$ from the additional N–M resource blocks which overlap Second Interfered Data Portion 1020b from neighboring second base station 675b may be used. Alternately values of zero in place of the data portion resource elements $y'_{i,j}$ from the additional N–M resource blocks which overlap Second Interfered Data Portion 1020b may be used, for example, to enhance immunity against noise.

A sixth process for interference resolution is similar to the processes described above. The sixth process may be used when there are overlapping or partially overlapping uplink transmissions from two interfering UEs, for example, as shown in FIG. 14, which the process will be described with reference to. In the transmissions of FIG. 14, in addition to PUSCH transmission 1055 from second UE 650b to neighboring second base station 675b, there is an additional PUSCH transmission 1080 from a third UE to neighboring second base station 675b.

The first base station 675a can resolve interference from First Interfering Data Portion 1065 to First Interfered Data Portion 1020a, for example, as described above for the fifth process for interference resolution.

Interference from Second Interfering Data Portion 1090a to Second Interfered Data Portion 1020b is resolved in a similar manner. In addition to the information that neighboring second base station 675b sends to first base station 675a for resolution of interference from First Interfering Data Portion 1065 to First Interfered Data Portion 1020a, neighboring second base station 675b also sends the corresponding information for Second Interfering Data Portion 1090a and Second Interfering RS Portion 1095a.

Similar to the interference resolution for the First Interfered Data Portion 1020a first process, for the Second Interfered Data Portion 1020b, the first base station 675a can, calculate the estimated channel transfer functions, as shown below, for example:

$h_{11}$ by correlating the reference signal extracted by its receiver for the Second Interfered RS Portion 1030b with the same length corresponding portion of the reference signal that first base station 675a expected to be used by the first UE 650a for Second Interfered RS Portion 1030b.

$h_{12}$ by correlating the reference signal extracted by its receiver for the Second Interfered RS Portion 1030b with the same length corresponding portion of the reference signal that neighboring second base station 675b expected to be used by the third UE for Second Interfering RS portion 1095a.

$h_{21}$ by correlating the reference signal extracted by neighboring second base station 675b for Second Interfering RS Portion 1095a with the same length corresponding portion of reference signal that first base station 675a expected to be used by the first UE 650a for Second Interfered RS Portion 1030b.

h$_{22}$ by correlating the reference signal extracted by neighboring second base station 675b for Second Interfering RS Portion 1095a with the same length corresponding portion of reference signal that neighboring second base station 675b expected to be used by the third UE for Second Interfering RS portion 1095a.

At this point, for the Second Interfered Data Portion 1020b, first base station 675a has output vector Y$_{i,j}$, and Ĥ, an estimate of channel transfer function matrix H, as shown in equation (4). The estimated channel transfer function matrix Ĥ can then be used to obtain the equalized joint estimate X̂$_{i,j}$ for $$X_{i,j} = \begin{bmatrix} x_{i,j}^d \\ x_{i,j}^u \end{bmatrix}$$

as shown in equation (5).

Many variations on this interference resolution process are possible. For example, first base station 675a may be passed the received version of the full reference signal 1095, composed of Second Interfering RS Portion 1095a and Third Interfering RS Portion 1095b, extracted by neighboring second base station 675b. First base station 675a may then calculate, for example, alternative estimated channel transfer functions as:

h$_{12}$ by correlating the concatenation of the reference signal extracted by its receiver corresponding to the N−M resource blocks of Second Interfered RS Portion 1030b and the reference signal extracted by its receiver corresponding to the L-N+M resource blocks of Third Interfering RS Portion 1095b with the full length reference signal 1095 that neighboring second base station 675b expected to be used by the third UE.

h$_{22}$ by correlating the full length reference signal extracted by neighboring second base station 675b corresponding to reference signal 1095 (composed of Second Interfering RS Portion 1095a and Third Interfering RS Portion 1095b) with the full length reference signal that neighboring second base station 675b expected to be used by the third UE for reference signal 1095.

A seventh process for interference resolution is similar to the processes described above. The seventh process may be used when there are partially overlapping uplink transmissions, for example, as shown in FIG. 15 which the process will be described with reference to. Interference from Fourth Interfering Data Portion 1515a to data element 1020 is resolved in a manner similar to that used in the sixth process for resolving interference from Second Interfering Data Portion 1090a to Second Interfered Data Portion 1020b (shown in FIG. 14).

Upon request from first base station 675a, neighboring second base station 675b provides the corresponding received frequency domain data elements, y'$_{i,j}$ for Fourth Interfering Data Portion 1515a and provides the expected and received Fourth Interfering RS Portion 1510a.

First base station 675a can estimate the channel transfer functions using its local uplink transmission data and uplink transmission data received from the neighboring second base station 675b. The neighboring second base station 675b may perform some of the calculations. Example calculations of the estimated channel transfer functions include calculating:

h$_{11}$ by correlating the reference signal extracted by the receiver of first base station 675a with the reference signal that first base station 675a expected to be used by the first UE 650a for reference signal 1030.

h$_{12}$ by correlating the reference signal extracted by the receiver of first base station 675a with the same length corresponding portion of the reference signal that neighboring second base station 675b expected to be used by second UE 650b for Fourth Interfering RS portion 1510a.

h$_{21}$ by correlating the reference signal extracted by neighboring second base station 675b with the same length corresponding portion of reference signal that first base station 675a expected to be used by first UE 650a for reference signal 1030.

h$_{22}$ by correlating the reference signal extracted by neighboring second base station 675b with the same length corresponding portion of the reference signal that neighboring second base station 675b expected to be used by the second UE 650b for Fourth Interfering RS portion 1510a.

For data element 1020, first base station 675a now has matrix Y$_{i,j}$, and Ĥ, an estimate of channel transfer function matrix H. The estimated channel transfer function matrix Ĥ can then be used to obtain the equalized joint estimate X̂$_{i,j}$ for $$X_{i,j} = \begin{bmatrix} x_{i,j}^d \\ x_{i,j}^u \end{bmatrix}$$

as shown in equation (5).

Many variations on this interference resolution process are possible. For example, neighboring second base station 675b may provide the full length expected reference signal for reference signal 1510, composed of Fourth Interfering RS Portion 1510a and Fifth Interfering RS Portion 1510b, and the received version of full reference signal 1510 extracted by neighboring second base station 675b. First base station 675a may then calculate alternative channel transfer functions estimates. Example calculations of the alternative estimated channel transfer functions include calculating:

h$_{12}$ by correlating the full length reference signal composed of a concatenation of the received reference signal corresponding to reference signal 1030 and reference signal related elements corresponding to Fifth Interfering RS Portion 1510b extracted by first base station 675a with the full length reference signal 1510 that the neighboring second base station 675a expected to be used by the second UE 650b.

h$_{22}$ by correlating the full length reference signal extracted by neighboring second base station 675b with the full length reference signal neighboring that the neighboring second base station 675b expected to be used by the second UE 650b for reference signal 1510.

An eighth process for interference resolution is similar to the processes described above. The eighth process may be used when there are interfering uplink transmissions from multiple UEs transmitting to multiple other base stations, for example, as shown in FIG. 16. Interference to PUSCH transmission 1010 from PUSCH transmission 1050 and PUSCH transmission 1525 may be resolved through extensions of the above processes to equations using matrices having more elements.

From the point of view of first base station 675a, the channel output at OFDM symbol index i, and subcarrier index j is given as shown in equation (10).

$$y_{i,j} = h_{i,j}^d x_{i,j}^d + h_{i,j}^{u2} x_{i,j}^{u2} + h_{i,j}^{u3} x_{i,j}^{u3} + n_{i,j} \qquad (10)$$

Where y$_{i,j}$ is the 1×1 channel output, x$_{i,j}^d$ is the 1×1 frequency domain resource element value from wanted signal 635a from the desired first UE 650a. $h_{i,j}^d$ is the 1×1 channel transfer function between the first UE 650a and the receiver of the first base station 675a, $x_{i,j}^{u2}$ is the frequency domain resource element value from interfering second UE 650b. $h_{i,j}^{u2}$ is the 1×1 channel transfer function between the interfering second UE 650b and the receiver of the first base station 675a. $x_{i,j}^{u3}$ is the frequency domain resource element value from interfering third UE. $h_{i,j}^{u3}$ is the 1×1 channel transfer function between the interfering third UE and the receiver of the first base station 675a. $n_{i,j}$ is the 1×1 noise value. The result, $\hat{x}_{i,j}^d$, of trying to solve for $x_{i,j}^d$ may be impaired by interference of the unwanted signals from interfering second UE 650b and interfering third UE and noise.

The received signal at the neighboring second base station 675b can be written as $$y'_{i,j} = h_{i,j}^{d\prime} x_{i,j}^d + h_{i,j}^{u2\prime} x_{i,j}^{u2} + h_{i,j}^{u3\prime} x_{i,j}^{u3} + n'_{i,j} \quad (11)$$

where $y'_{i,j}$ is the 1×1 channel output, $h_{i,j}^{d\prime}$ is the 1×1 channel transfer function between the first UE 650a and the receiver of the neighboring second base station 675b, $h_{i,j}^{u2\prime}$ is the 1×1 channel transfer function between the interfering second UE 650b and the receiver of the neighboring second base station 675b, $h_{i,j}^{u3\prime}$ is the 1×1 channel transfer function between the interfering third UE and the receiver of the neighboring second base station 675b, $n'_{i,j}$ is the 1×1 noise value.

The received signal at neighboring third base station can be written as:

$$y''_{i,j} = h_{i,j}^{d\prime\prime} x_{i,j}^d + h_{i,j}^{u2\prime\prime} x_{i,j}^{u2} + h_{i,j}^{u3\prime\prime} x_{i,j}^{u3} + n''_{i,j} \quad (11)$$

where $y''_{i,j}$ is the 1×1 channel output, $h_{i,j}^{d\prime\prime}$ is the 1×1 channel transfer function between the first UE 650a and the receiver of the neighboring third base station, $h_{i,j}^{u2\prime\prime}$ is the 1×1 channel transfer function between the interfering second UE 650b and the receiver of the neighboring third base station, $h_{i,j}^{u3\prime\prime}$ is the 1×1 channel transfer function between the interfering third UE and the receiver of the neighboring third base station, $n''_{i,j}$ is the 1×1 noise value.

Equation (3) is then replaced with equation (13) which is the 3×3 matrix representation obtained by aggregating equations (10), (11), and (12).

$$\begin{bmatrix} y_{i,j} \\ y'_{i,j} \\ y''_{i,j} \end{bmatrix} = \begin{bmatrix} h_{i,j}^d & h_{i,j}^{u2} & h_{i,j}^{u3} \\ h_{i,j}^{d\prime} & h_{i,j}^{u2\prime} & h_{i,j}^{u3\prime} \\ h_{i,j}^{d\prime\prime} & h_{i,j}^{u2\prime\prime} & h_{i,j}^{u3\prime\prime} \end{bmatrix} \begin{bmatrix} x_{i,j}^d \\ x_{i,j}^{u2} \\ x_{i,j}^{u3} \end{bmatrix} + \begin{bmatrix} n_{i,j} \\ n'_{i,j} \\ n''_{i,j} \end{bmatrix} \triangleq Y_{ij} \quad (13)$$

$$= H_{ij} X_{ij} + N_{ij}$$

To decode the received data, first base station 675a will create an estimate, $\hat{x}_{i,j}^d$ for each $x_{i,j}^d$ for all i, j. To do this, first base station 675a may build the matrix $Y_{i,j}$ from the frequency domain data elements received by its receiver (e.g., received frequency-domain resource element values 585 in the SC-FDMA receiver 500) and those received by neighboring base stations' receivers. Additionally, an estimate of channel matrix $H_{i,j}$ may be calculated, resulting in $\hat{H}$ as shown in equation (14).

$$\hat{H} = \begin{bmatrix} h_{11} & h_{12} & h_{13} \\ h_{21} & h_{22} & h_{23} \\ h_{31} & h_{32} & h_{33} \end{bmatrix} \quad (14)$$

For the resource blocks corresponding to interfered PUSCH transmission 1010, first base station 675a requests uplink transmission data from neighboring second base station 675b. The requested uplink transmission data may include:

Frequency domain data elements $y'_{i,j}$, or information sufficient to recreate them such as the FFT output, corresponding to resource elements for the data elements 1060 of PUSCH transmission 1050.

The reference signal that neighboring second base station 675b expected to be received from second UE 650b for reference signal 1070.

The reference signal extracted by neighboring second base station 675b for the resource blocks corresponding to reference signal 1070.

For the resource blocks corresponding to interfered PUSCH transmission 1010, first base station 675a requests uplink transmission data from neighboring third base station. The requested uplink transmission data may include:

Frequency domain data elements $y''_{i,j}$, or information sufficient to recreate them such as the FFT output, corresponding to resource elements for the data elements 1535 of PUSCH transmission 1525.

The reference signal the neighboring third base station expected to be received from the third UE for reference signal 1530.

The reference signal extracted by the neighboring third base station for the resource blocks corresponding to reference signal 1530.

First base station 675a can estimate the channel transfer functions using its local uplink transmission data and the uplink transmission data received from the neighboring base stations. Some of the calculations may be performed by the neighboring base stations or a central entity. Similar to the first process, the first base station 675a may, for example, calculate:

$h_{11}$ by correlating the reference signal extracted by the receiver of first base station 675a with the reference signal 1030 that first base station 675a expected to be used by the first UE 650a.

$h_{12}$ by correlating the reference signal extracted by the receiver of first base station 675a with the reference signal 1070 that neighboring second base station 675b expected to be used by second UE 650b.

$h_{13}$ by correlating the reference signal extracted by the receiver of first base station 675a with the reference signal 1530 that neighboring third base station expected to be used by the third UE.

$h_{21}$ by correlating the reference signal extracted by neighboring second base station 675b with the reference signal 1030 that first base station 675a expected to be used by first UE 650a.

$h_{22}$ by correlating the reference signal extracted by neighboring second base station 675b with the reference signal 1070 that neighboring second base station 675b expected to be used by the second UE 650b.

$h_{23}$ by correlating the reference signal extracted by neighboring second base station 675b with the reference signal 1530 that neighboring third base station expected to be used by the third UE.

$h_{31}$ by correlating the reference signal extracted by the neighboring third base station with the reference signal 1030 that first base station 675a expected to be used by the first UE 650a.

$h_{32}$ by correlating the reference signal extracted by neighboring third base station with the reference signal 1070 that neighboring second base station 675b expected to be used by the second UE 650b.

$h_{33}$ by correlating the reference signal extracted by neighboring third base station with the reference signal 1530 that neighboring third base station expected to be used by the third UE.

For data element 1020, first base station 675a now has matrix $Y_{i,j}$, and $\hat{H}$, an estimate of channel transfer function matrix H, as shown in equation (13). The estimated channel transfer function matrix $\hat{H}$ can then be used to obtain the equalized joint estimate $\hat{X}_{i,j}$ for $X_{i,j}$ as shown in equation (5), providing estimate $\hat{x}_{i,j}{}^d$. In this case only the top row of the inverse estimated channel transfer function matrix $\hat{H}^{-1}$ is used for calculating estimate $\hat{x}_{i,j}{}^d$ of $x_{i,j}{}^d$ as only $x_{i,j}{}^d$ is the target of estimation.

Instead of initially requesting help from multiple neighboring base stations, the first base station may request and use information from one neighboring base station and if that is unsuccessful, requesting information from one or more additional neighboring base stations, retrying until decoding is successful or help from neighboring base station is exhausted.

The various interference resolution and decoding ambiguity reduction methods described herein may be applied individually or in combination. The method may be applied to all or subsets of all possible combinations of interfered and not interfered portions of a PUSCH transmission. The methods may be performed on smaller or larger sets of resource blocks, individual resource blocks, or sets of frequency subchannels. The methods may also be applied when there is no interfering UE, but a neighboring base station listens to the uplink and aids with interference mitigation. Additionally, if a calculation requires a piece of information from each of two base stations, a protocol can be implemented where either the first base station can transmit it's portion to the second base station as a part of the request, allowing the second base station to calculate the desired result and return it in a response, or the second base station may return the information required for the calculation to the first base station which would then perform the calculation locally. Alternatively, a central entity may receive perform the calculations.

LTE allows neighboring base stations to use different channel bandwidths. For instance, one base station may be using 10 MHz channels while an adjacent base station may be using 5 MHz channels. While this may impact the description of the interfered and interfering portions used in requests and responses, the interference resolution and decoding ambiguity reduction methods described herein may be adapted for use with different channel bandwidths.

Forms of Information Exchange

The interference resolution and decoding ambiguity reduction methods described herein include the exchange of information between base stations (or other entities).

In an initial request for assistance, a first base station may include an indication of the uplink time-frequency resources that were interfered, allowing an assisting neighboring second base station to know what UL transmission the assisting neighboring second base station expected to receive were overlapping in time and frequency. For instance, in an LTE system, the first base station may indicate the frame number, either absolute or relative, in which the interference or inability to decode the uplink transmission occurred. Alternatively it may specify a time in accordance with a time standard such as provided by the global positioning system (GPS). The first base station may also specify the resource blocks of interest. Resource blocks may be indicated by the subframe within the frame and the slot within the subframe as well as the subchannels within the slots. Identification of resource blocks may alternatively be expressed in a form similar (for example, normalized for frequency hopping) to how the resource blocks making up the uplink resource grant is expressed to the UE which transmitted in the uplink resource grant. If neighboring base stations are allowed to have different channelization, the request may also include a description of the channel such as center frequency, channel width (e.g., 5 MHz or 10 MHz), and subchannel spacing or FFT size.

The response from the neighboring second base station may include the same information for every UL transmission it expected on the uplink that overlaps in time and frequency with the interfered reception of the first base station. Neighboring second base station may also include indications of portions of its uplink that overlapped in time and frequency with the interfered reception of the first base station but did not contain any interfering uplink transmissions by UEs to the neighboring second base station.

Observed or estimated frequency domain data element values, e.g., $y'_{i,j}$ and $\hat{x}_{i,j}{}^u$, may be exchanged, for instance, in the form of phase, amplitude pairs identified per symbol i and subcarrier j.

Received reference signal may also take the form of phase, amplitude pairs for each symbol and subcarrier of the reference signal.

The expected reference signal may take the same form as the received reference signal. Alternatively, information that allows the reconstruction of the expected reference signal or selection from a known set of reference signals may be exchanged. For instance, in LTE, a reference signal can be described by sequence length in resource blocks, sequence group number, cyclic shift value, usage information related to orthogonal cover code of LTE, and operating parameters that are associated with group hopping, sequence hopping and cyclic shift hopping patterns.

Channel transfer functions, e.g., $h_{21}$ and $h_{22}$, are complex values and may be exchanged as pairs of fixed or floating point numbers.

The FFT output, when exchanged, may take the form of a series of in-phase and quadrature (I&Q) value pairs, which may be exchanged as fixed or floating point numbers, binned by subchannel for each OFDM symbol in the reception in question.

Cross Correlation Nulling

The interference resolution methods described above may have reduced performance when the reference signal, or portion thereof, expected to be received by the first base station and the reference signal, or portion thereof, expected to be received by a neighboring base station in the same slot and in overlapping subcarriers have a non-zero cross correlation which impacts the ability to estimate the channel transfer functions. Cross correlation nulling techniques to remedy such impact are provided. Additionally, the cross correlation nulling techniques may be used to improve the channel transfer function estimate even when the reference signals come from the same base station, as long as they have some difference such as length or offset in subchannel.

Figure 17:
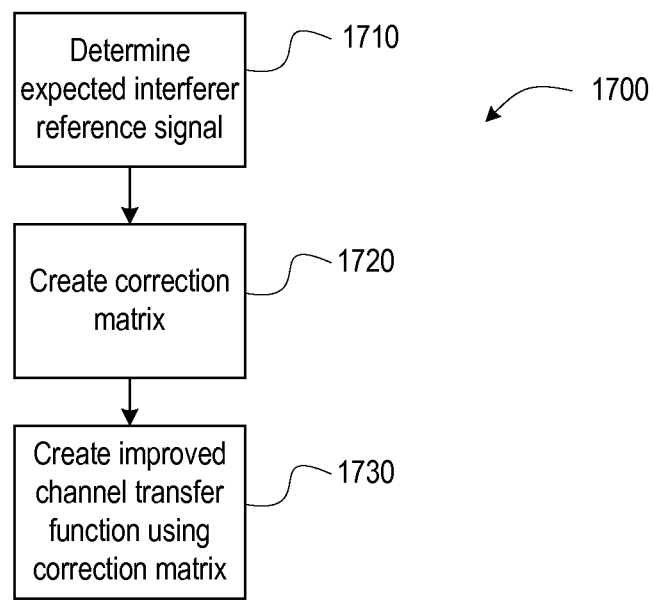
FIG. 17 is a flowchart of a process for creating improved channel transfer function estimate matrices according to an example embodiment of the present invention.

FIG. 17 is a flowchart of a process 1700 for creating improved channel transfer function estimate matrices according to an example embodiment of the present invention. The process may, for example, be performed by the various the base stations (macro, femto, or pico) depicted in FIG. 1, 2, 3, or 6 and with the method for performing on-demand uncoordinated UL multipoint interference resolution of FIG. 8.

In step 1710, the process determines information regarding a reference signal expected to be used in a transmission from an interfering UE. The expected reference signal information may be, for example, the expected reference signal or information from with the expected reference signal can be created. The information may be obtained, upon request, from a neighboring base station that was the intended recipient of the transmission from the interfering UE.

When information regarding reference signals expected to be received at neighboring base stations is available at a first base station, for example via the information exchanges described above, the first base station may create an improved version, $\hat{H}'$ of the estimated channel transfer function matrix $\hat{H}$. Examples of improved versions of the channel transfer function estimate matrix are shown for the 2×2 and 3×3 cases in equation (15), corresponding to equations (4) and (14).

$$\hat{H}' = \begin{bmatrix} h'_{11} & h'_{12} \\ h'_{21} & h'_{22} \end{bmatrix}, \quad (15)$$

$$\hat{H}' = \begin{bmatrix} h'_{11} & h'_{12} & h'_{13} \\ h'_{21} & h'_{22} & h'_{23} \\ h'_{31} & h'_{32} & h'_{33} \end{bmatrix}, \text{ etc.}$$

In step 1720, the process creates a correction matrix. The correction matrix may also be referred to as a cross-correlation matrix when it removes or reduces the effects of cross-correlation on estimated channel transfer functions.

In step 1730, the process creates one or more corrected channel transfer function estimates or corrected estimated channel transfer function matrices. A corrected estimated channel transfer function matrix may also be referred to as an improved estimated channel transfer function matrix. The corrected estimated channel transfer functions can then be used in an interference resolution process. The corrected estimated channel transfer functions may be created by applying the correction matrix to previously calculated estimated channel transfer functions.

To apply cross correlation nulling, a cross-correlation matrix, C, is calculated from the reference signal expected to be received by the first base station and the reference signals expected to be received by neighboring base stations. The inverse of cross-correlation matrix C is applied to the estimated channel transfer function matrix $\hat{H}$ to create the improved estimated channel transfer function matrix $\hat{H}'$ as shown in equation (16).

$$\hat{H}' = \hat{H} C^{-1} \quad (16)$$

The transmission overlap scenarios previously discussed with respect to FIGS. 11, 13, 14, 15, and 16 present different possibilities for calculating and applying the cross-correlation matrix C. The application of cross correlation nulling to the channel transfer function estimate is not limited to these overlap scenarios and the technique can be applied to the many other transmission overlap scenarios that may occur.

A first example of cross-correlation nulling will be described with reference to FIG. 11 where the wanted and interfering PUSCH transmissions cover the same set of frequency subchannels. The first base station computes the cross correlation, $c_1$, of the reference signal 1030 it expected to receive with the reference signal 1070 expected to be received by the neighboring second base station, as shown in equation (17).

$$c_1 = \text{cxcorr}(R_A, R_B) \quad (17)$$

Where $R_A$ denotes reference signal 1030 and $R_B$ denotes reference signal 1070. The cross correlation value $c_1$ is calculated by a cross correlation function cxcorr with the two argument vectors $R_A$ and $R_B$. The cross correlation function cxcorr for example may be the circular cross correlation between its two argument vectors calculated at a zero relative delay value and normalized by the length of the argument vectors. Other cross-correlation functions may also be used.

The cross-correlation matrix C for this scenario is shown in equation (18), where $c_1^*$ denotes the conjugate of $c_1$.

$$C = \begin{bmatrix} 1 & c_1 \\ c_1^* & 1 \end{bmatrix} \quad (18)$$

The cross-correlation matrix C is applied as shown in equation (16) to create improved channel transfer function estimates that may be used in the interference resolution processes described herein.

A second example of cross-correlation nulling will be described with respect to FIG. 13 where the first M resource blocks, comprising $n_M$ subchannels, of PUSCH transmission 1010 is interfered by PUSCH transmission 1055 and the second N–M resource blocks, comprising $n_{N-M}$ subchannels, of PUSCH transmission 1010 is not interfered by a transmission to the neighboring second base station.

In a variation of the fifth process for interference resolution described above for this interference scenario, $h_{11}$ is calculated by correlating the received version of full reference signal 1030, composed of First Interfered RS Portion 1030a and Second Interfered RS Portion 1030b, that is extracted by the receiver of first base station 675a with the full length reference signal expected to be used by the first UE 650a, and $h_{21}$ is calculated by correlating the full length reference signal composed of the received version of reference signal 1075 and the reference signal resource elements from the additional N–M resource blocks which overlap Second Interfered RS Portion 1030b, extracted by the neighboring second base station 675b, with the full length reference signal expected to be used by the first UE 650a. In this variation, two cross correlations may be calculated to construct the cross-correlation matrix C. The first calculated cross correlation is the cross correlation of the entire expected reference signal 1030 with the expected reference signal 1075 padded to be the same length as expected reference signal 1030 by inserting zeros for subchannels of slot 1045 not overlapped by subchannels of reference signal 1075. This is shown in equation (19), where $R_A$ denotes reference signal 1030 and $R_B$ denotes reference signal 1075 and where $[n_j:n_k]$ denotes the range of subchannels from j to k. The second calculated cross correlation is the cross correlation of only the portion of expected reference signal 1030 transmitted over those subchannels that are overlapped by reference signal 1075, for example first interfered RS portion 1030a, with the expected reference signal 1075. This is shown in equation (20).

$$c_1 = \text{cxcorr}(R_A, R_B + \text{zeros}[n_{M+1}:n_N]) \quad (19)$$

$$c_2 = \text{cxcorr}(R_A[1:n_M], R_B) \quad (20)$$

The cross-correlation matrix C for this scenario as shown in equation (21), and may be applied to create improved channel transfer function estimates that may be used as described earlier.

$$C = \begin{bmatrix} 1 & c_2 \\ c_1^* & 1 \end{bmatrix} \quad (21)$$

Alternatively, $c_2$ from equation (20) can be used by itself. The cross-correlation matrix C for this scenario is shown in equation (22).

$$C = \begin{bmatrix} 1 & c_2 \\ c_2^* & 1 \end{bmatrix} \quad (22)$$

The above equations can be adapted to scenarios, for example, where reference signal 1075 overlapped a different, for example last or middle, subset of the subchannels of reference signal 1030.

Another example of cross-correlation nulling will be described with respect to FIG. 14. The cross correlation nulling may be applied separately for the first interfered RS portion 1030*a* of expected reference signal 1030 with respect to first interfering RS portion 1075 and for the second interfered RS portion 1030*b* of expected reference signal 1030 with respect to second interfering RS portion 1095*a* of expected reference signal 1095.

For first interfered RS portion 1030*a*, the expected reference signal is cross correlated with the expected reference signal for first interfering RS portion 1075 as shown in equation (20).

The cross-correlation matrix C for this scenario is shown in equation (22), and may be applied to improve the channel transfer function estimate for the subchannels on which the first interfered RS portion 1030*a* was transmitted.

For second interfered RS portion 1030*b*, the expected reference signal is cross correlated with the expected reference signal for second interfering RS portion 1095*a* of expected reference signal 1095 as shown in equation (23), where $R_C$ denotes reference signal 1095.

$$c_3 = \text{cxcorr}(R_A[n_{M+1}:n_N], R_C[1:n_{N+M}]) \quad (23)$$

The cross-correlation matrix C for this scenario as shown in equation (24), and may be applied to improve the channel transfer function estimate for the subchannels on which the second interfered RS portion 1030*b* was transmitted.

$$C = \begin{bmatrix} 1 & c_3 \\ c_3^* & 1 \end{bmatrix} \quad (24)$$

Another example of cross-correlation nulling will be described with respect to FIG. 15. Two methods for creating a cross-correlation matrix C for improving the channel transfer function for the subchannels occupied by PUSCH transmission 1010 will be described. For both methods, a first cross correlation, $c_1$, is calculated between the expected reference signal 1030 and the fourth interfering RS portion 1510*a* of expected reference signal 1510, as shown in equation (25).

$$c_1 = \text{cxcorr}(R_A, R_B[1:n_N]) \quad (25)$$

In the first method with respect to the overlap scenario of FIG. 15, $c_1$ is used in equation (18) to produce the cross-correlation matrix C. In the second method with respect to the overlap scenario of FIG. 15, a second cross correlation, $c_2$, is calculated as shown in equation (26) with reference signal 1030 zero padded to be the same length as reference signal 1510.

$$c_2 = \text{cxcorr}(R_A + \text{zeros}[n_{N+1}:n_P], R_B) \quad (26)$$

The cross correlations $c_1$ and $c_2$ may be used together in equation (21) to produce an alternative cross-correlation matrix C for the overlap scenario of FIG. 15. Equations (25) and (26) can be adjusted to account for different overlaps of reference signal 1030 with longer reference signal 1510.

Another example of cross-correlation nulling will be described with respect to FIG. 16. Three cross correlations may be performed to create a 3×3 version of cross-correlation matrix C to create a 3×3 version of improved channel transfer function matrix Ĥ'.

Cross correlation $c_1$ is calculated as in equation (18). Cross correlation $c_2$ is calculated as in equation (27). Cross correlation $c_3$ is calculated as in equation (28). Where $R_A$ denotes reference signal 1030, $R_B$ denotes reference signal 1070, and $R_C$ denotes reference signal 1530, $$c_2 = \text{cxcorr}(R_A, R_C) \quad (27)$$

$$c_3 = \text{cxcorr}(R_B, R_C) \quad (28)$$

Cross correlations $c_1$, $c_2$, and $c_3$ are used in equation (29) to calculate the 3×3 version of cross-correlation matrix C which can be used to create an improved channel transfer function estimate to be used in the interference resolution processes described herein.

$$C = \begin{bmatrix} 1 & c_1 & c_2 \\ c_1^* & 1 & c_3 \\ c_2^* & c_3^* & 1 \end{bmatrix} \quad (29)$$

The cross correlation nulling for the described scenarios provides building blocks which may be used and extended to improve channel transfer function estimates for all combinations of overlap scenarios that may arise in performing interference resolution.

Improving the channel estimate with the above techniques may allow the first base station (which is performing interference resolution) to be more aggressive in its use of spectrum. For example, the first base station may use more efficient modulation or coding schemes than it could without the techniques for interference resolution. The first base station may also use fewer retransmissions, such as fewer hybrid automatic repeat request (HARD) retransmissions. The first base station may use a more efficient unacknowledged transport mode rather than an acknowledged transport mode.

The embodiments disclosed herein related to channel estimation and detection are presented for explanatory purposes and it should be appreciated that the concepts presented herein can also be applied to other techniques and modalities. The foregoing systems and methods and associated devices and modules are susceptible to many variations. For example, the systems and methods method can be extended to MIMO systems by using appropriately dimensioned channel transfer functions. Additionally, for clarity and concision, many descriptions of the systems and methods have been simplified. For example, the figures generally illustrate one of each type of device (e.g., one base station, one user equipment), but a communication system may have many of each type of device. Similarly, many descriptions use terminology and structures of a specific wireless standard such as LTE. However, the disclosed systems and methods are more broadly applicable, including for example, in WiMAX systems.

Those of skill will appreciate that the various illustrative logical blocks, modules, units, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular constraints imposed on the overall system. Skilled persons can implement the described functionality in varying ways for each particular system, but such implementation decisions should not be interpreted as causing a departure from the scope of the invention. In addition, the grouping of functions within a unit, module, block, or step is for ease of description. Specific functions or steps can be moved from one unit, module, or block without departing from the invention.

The various illustrative logical blocks, units, steps and modules described in connection with the embodiments disclosed herein can be implemented or performed with a processor, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm and the processes of a block or module described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC. Additionally, device, blocks, or modules that are described as coupled may be coupled via intermediary device, blocks, or modules. Similarly, a first device may be described a transmitting data to (or receiving from) a second device when there are intermediary devices that couple the first and second device and also when the first device is unaware of the ultimate destination of the data.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter that is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A method for generating a corrected channel transfer function in a first receiver node, the method comprising:
receiving, at the first receiver node, first expected reference signal information associated with an interfering transmitter node;
creating, by the first receiver node, a correction matrix based at least on the first expected reference signal information associated with the interfering transmitter node and on second expected reference signal information associated with an intended transmitter node; and
applying, by the first receiver node, the correction matrix to an estimated channel transfer function, the estimated transfer function being associated with a received transmission from the intended transmitter node, to generate a corrected channel transfer function, the corrected transfer function being associated with the received transmission from the intended transmitter node.

2. The method of claim 1, wherein the estimated channel transfer function is further associated with a received transmission from the interfering transmitter node.

3. The method of claim 1, wherein the estimated channel transfer function associated with the received transmission from the intended transmitter node is a component of a channel transfer function matrix that also includes another estimated channel transfer function that is associated with a received transmission from the interfering transmitter node.

4. The method of claim 1, wherein the first expected reference signal information associated with the interfering transmitter node is received from a second receiver node.

5. The method of claim 4, further including the step of receiving, at the first receiver node, a set of communication operating parameters from the second receiver node.

6. The method of claim 4, wherein the first expected reference signal information associated with the interfering transmitter node is received from the second receiver node in response to a request from the first receiver node.

7. The method of claim 6, wherein the first receiver node sends the request to the second receiver node on the condition that the first receiver node has unsuccessfully attempted to decode the received transmission from the intended transmitter node.

8. The method of claim 1, wherein the transmission from the intended transmitter node is transmitted in a first resource allocation that is the same number of resource blocks in size as a second resource allocation in which a second transmission from the interfering transmitter node is transmitted.

9. The method of claim 8, wherein the first resource allocation has at least one overlapping resource block with the second resource allocation.

10. The method of claim 1, wherein the transmission from the intended transmitter node is transmitted in a first resource allocation that is a different number of resource blocks in size than a second resource allocation in which a second transmission from the interfering transmitter node is transmitted.

11. The method of claim 1, wherein the correction matrix is based at least in part on a cross correlation function based on the first expected reference signal information associated with the interfering transmitter node and on the second expected reference signal information associated with the intended transmitter node.

12. The method of claim 1, wherein the corrected channel transfer function is used to perform interference resolution on the received transmission from the intended transmitter node.

13. The method of claim 1, wherein the estimated channel transfer function associated with the received transmission from the intended transmitter node is determined by the first receiving node.

14. The method of claim 4, wherein at least one component of the estimated channel transfer function associated with the received transmission from the intended transmitter node is determined by the second receiving node.

15. An access node comprising:
a transceiver module configured to receive and send data via a wireless communication network;
a backhaul interface module configured to receive and send data via a backhaul communication link, the received data including first expected reference signal information associated with an interfering user equipment;
a memory module; and
a processor module coupled to the backhaul interface module and the memory module and configured to:
create a correction matrix based at least on the first expected reference signal information associated with the interfering user equipment and on second expected reference signal information associated with an intended user equipment; and
apply the correction matrix to an estimated channel transfer function, the estimated transfer function being associated with a received transmission from the intended user equipment, to generate a corrected channel transfer function, the corrected transfer function being associated with the received transmission from the intended user equipment.

16. The access node of claim 15, wherein the estimated channel transfer function is further associated with a received transmission from the interfering user equipment.

17. The access node of claim 15, wherein the estimated channel transfer function associated with the received transmission from the intended user equipment is a component of a channel transfer function matrix that also includes another estimated channel transfer function that is associated with a received transmission from the interfering user equipment.

18. The access node of claim 15, wherein the first expected reference signal information associated with an interfering user equipment is received from a second access node.

19. The access node of claim 18, wherein the first expected reference signal information associated with the interfering user equipment is received from the second access node in response to a request from the access node.

20. The access node of claim 19, wherein the access node sends the request to the second access node on the condition that the access node has unsuccessfully attempted to decode the received transmission from the intended user equipment.

21. The access node of claim 15, wherein the transmission from the intended user equipment is transmitted in a first resource allocation that is the same resource block size as a second resource allocation in which a second transmission from the interfering user equipment is transmitted.

22. The access node of claim 15, wherein the transmission from the intended user equipment is transmitted in a first resource allocation that is a different resource block size than a second resource allocation in which a second transmission from the interfering user equipment is transmitted.

23. The access node of claim 22, wherein the first resource allocation has at least one overlapping resource block with the second resource allocation.

24. The access node of claim 15, wherein the correction matrix is based at least in part on a cross correlation function based on the first expected reference signal information associated with the interfering user equipment and on the second expected reference signal information associated with the intended user equipment.

25. The access node of claim 15, wherein the corrected channel transfer function is used to decode the received transmission from the intended user equipment.

26. The access node of claim 15, wherein the estimated channel transfer function associated with the received transmission from the intended user equipment is determined by the access node.

27. The access node of claim 18, wherein at least one component of the estimated channel transfer function associated with the received transmission from the intended user equipment is determined by the second access node.

* * * * *